US012604042B2

(12) United States Patent　　(10) Patent No.: US 12,604,042 B2
Hendry　　(45) **Date of Patent: *Apr. 14, 2026**

(54) LAYER INFORMATION SIGNALING-BASED IMAGE CODING DEVICE AND METHOD

(71) Applicant: LG ELECTRONICS INC., Seoul (KR)

(72) Inventor: Hendry Hendry, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,231

(22) Filed: May 20, 2024

(65) Prior Publication Data

US 2024/0305832 A1　　Sep. 12, 2024

Related U.S. Application Data

(63) Continuation of application No. 18/075,289, filed on Dec. 5, 2022, now Pat. No. 12,041,274, which is a continuation of application No. PCT/KR2021/007089, filed on Jun. 7, 2021.

(60) Provisional application No. 63/035,748, filed on Jun. 6, 2020.

(51) Int. Cl.
H04N 19/70 (2014.01)
H04N 19/169 (2014.01)
H04N 19/31 (2014.01)

(52) U.S. Cl.
CPC .......... H04N 19/70 (2014.11); H04N 19/188 (2014.11); H04N 19/31 (2014.11)

(58) Field of Classification Search
CPC ...... H04N 19/70; H04N 19/188; H04N 19/31; H04N 21/816; H04N 19/184
See application file for complete search history.

(56) References Cited

U.S. PATENT DOCUMENTS

| | | | |
|---|---|---|---|
| 7,586,924 B2 * | 9/2009 | Wiegand ............ | H04N 21/8451 370/395.64 |
| 2011/0064142 A1 * | 3/2011 | Haskell .................. | H04N 19/21 375/240.01 |
| 2014/0301485 A1 * | 10/2014 | Ramasubramonian ...................... | H04N 19/30 375/240.27 |
| 2015/0195563 A1 * | 7/2015 | Ramasubramonian ...................... | H04N 19/44 375/240.15 |
| 2015/0271525 A1 * | 9/2015 | Hendry ................ | H04N 19/107 375/240.27 |
| 2015/0312580 A1 * | 10/2015 | Hannuksela ............ | G06F 9/268 375/240.02 |
| 2015/0373346 A1 * | 12/2015 | Wang ................... | H04N 19/188 375/240.02 |
| 2016/0212439 A1 * | 7/2016 | Hannuksela ........... | H04N 19/46 |

(Continued)

*Primary Examiner* — Richard A Hansell, Jr.
(74) *Attorney, Agent, or Firm* — Bryan Cave Leighton Paisner LLP

(57) ABSTRACT

According to an embodiment (embodiments) of the present document, multilayer-based coding may be executed. In the multilayer-based coding, a decoded picture based on a target output layer can be output, and, for example, the target output layer can be determined on the basis of an external means or signaled information. According to an embodiment according to the present document, image information acquired from a bitstream can include a specific NAL unit for scheduling target output layer-related information.

14 Claims, 10 Drawing Sheets

(56) References Cited

U.S. PATENT DOCUMENTS

2016/0381393 A1* 12/2016 Tsukuba ................. H04N 19/44
                                                 375/240.12
2017/0026655 A1* 1/2017 Deshpande ............ H04N 19/61
2022/0286710 A1* 9/2022 Pettersson ............ H04N 19/188

* cited by examiner

LAYER INFORMATION SIGNALING-BASED IMAGE CODING DEVICE AND METHOD

CROSS-REFERENCE TO PRIOR APPLICATIONS

This application is a Continuation of U.S. patent application Ser. No. 18/075,289 filed on Dec. 5, 2022, which is a Continuation of International Application No. PCT/KR2021/007089 filed on Jun. 7, 2021, which claims priority to U.S. Provisional Application No. 63/035,748 filed on Jun. 6, 2020, the contents of which are hereby incorporated by reference herein in their entirety.

BACKGROUND OF THE DISCLOSURE

Field of the Disclosure

The present disclosure relates to a layer information signaling-based image coding apparatus and method.

Related Art

The demands for high-resolution and high-quality images and video, such as an ultra-high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

Also, there is a discussion on coding techniques based on multi-layers for satisfying the requirements for compression/transmission efficiency and scalability. There is a need for a method for efficiently signaling related information to apply the coding techniques efficiently.

SUMMARY

According to one embodiment of the present disclosure, a method and apparatus for improving image/video coding efficiency is provided.

According to one embodiment of the present disclosure, a method and apparatus for improving information transfer efficiency for image/video coding is provided.

According to one embodiment of the present disclosure, a multilayer-based coding apparatus and method is provided.

According to one embodiment of the present disclosure, a target output layer may be configured, and a decoded picture based on the target output layer may be output.

According to one embodiment of the present disclosure, the target output layer may be determined based on an external means or signaled information.

According to one embodiment of the present disclosure, the external means may be used preferentially over the signaled information for the target output layer.

According to one embodiment of the present disclosure, temporal scalability using the highest temporal layer for setting the highest temporal layer may be applied to picture decoding.

According to one embodiment of the present disclosure, the highest temporal layer may be determined based on an external means or signaled information.

According to one embodiment of the present disclosure, an external means may be used preferentially over signaled information for the highest temporal layer.

According to one embodiment of the present disclosure, an encoding apparatus performing video/image encoding is provided.

According to one embodiment of the present disclosure, a computer-readable digital storage medium storing encoded video/image information generated based on the video/image encoding method disclosed in at least one of the embodiments of the present disclosure is provided.

According to one embodiment of the present disclosure, a computer-readable digital storage medium storing encoded information or encoded video/image information that causes a decoding apparatus to perform the video/image decoding method disclosed in at least one of the embodiments of the present disclosure.

Advantageous Effects

According to one embodiment of the present disclosure, the overall image/video compression efficiency may be improved.

According to one embodiment of the present disclosure, image transfer efficiency for the overall image/video compression may be improved.

According to one embodiment of the present disclosure, a procedure of parsing related syntax elements from the entire bitstream may be omitted, and a target OLS index and/or the highest temporal ID may be set efficiently through an external means.

According to one embodiment of the present disclosure, information signaling using the specific NAL unit may reduce an unnecessary parsing procedure and efficiently distribute parsed information.

BRIEF DESCRIPTION OF THE DRAWINGS

FIG. 5 is a block diagram of a decoding apparatus performing multilayer-based decoding of a video/image signal according to an embodiment(s) of the present disclosure.

DESCRIPTION OF EXEMPLARY EMBODIMENTS

Figure 1:
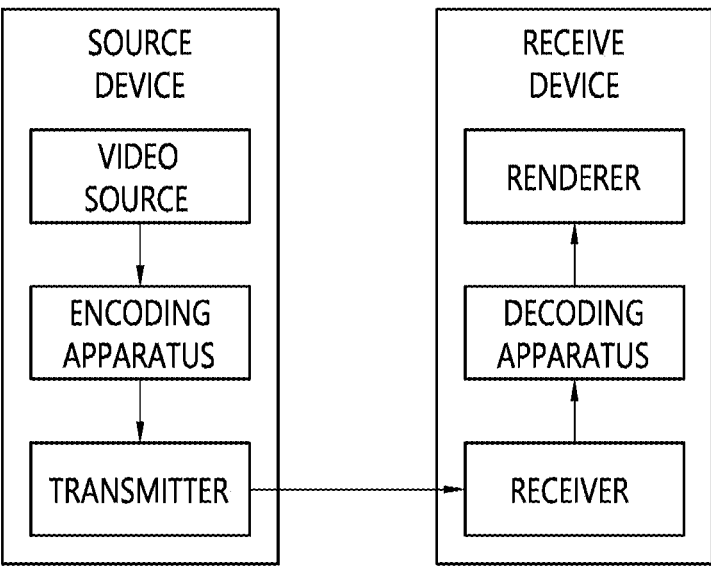
FIG. 1 schematically illustrates an example of a video/image coding system applicable to exemplary embodiments of the present document.

In this document, video may refer to a series of images over time. Picture generally refers to a unit representing one image in a specific time zone, and a slice/tile is a unit constituting part of a picture in coding. The slice/tile may include one or more coding tree units (CTUs). One picture may consist of one or more slices/tiles. One picture may consist of one or more tile groups. One tile group may include one or more tiles.

A pixel or a pel may mean a smallest unit constituting one picture (or image). Also, "sample" may be used as a term corresponding to a pixel. A sample may generally represent a pixel or a value of a pixel and may represent only a pixel/pixel value of a luma component or only a pixel/pixel value of a chroma component. Also, a sample may mean a pixel value in the spatial domain, and when the pixel value in the spatial domain is transformed into the frequency domain, the sample may mean a transform coefficient in the frequency domain.

The present disclosure relates to video/image coding. For example, a method/embodiment in the present disclosure may be related to the Versatile Video Coding (VVC) standard (ITU-T Rec. H.266), the next-generation video/image coding standard subsequent to the VVC, or other video coding-related standards (for example, High Efficiency Video Coding (HEVC) standard (ITU-T Rec. H.265), essential video coding (EVC) standard, and the AVS2 standard).

The present disclosure suggests various embodiments of video/image coding, and the embodiments may also be performed in combination with each other unless otherwise specified.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

Hereinafter, preferred embodiments of this document are described more specifically with reference to the accompanying drawings. Hereinafter, in the drawings, the same reference numeral is used in the same element, and a redundant description of the same element may be omitted.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

In the present disclosure, "at least one of A and B" may mean "only A," "only B," or "both A and B." Also, in the present disclosure, the expression "at least one of A or B" or "at least one of A and/or B" may be interpreted the same as "at least one of A and B."

Also, in the present disclosure, "at least one of A, B and C" may mean "only A," "only B," "only C," or "any combination of A, B and C." Also, "at least one of A, B or C" or "at least one of A, B and/or C" may mean "at least one of A, B and C."

Also, parentheses used in the present disclosure may mean "for example." Specifically, when "prediction (intra prediction)" is indicated, "intra prediction" may be proposed as an example of "prediction." In other words, "prediction" in the present disclosure is not limited to "intra prediction," and "intra prediction" may be proposed as an example of "prediction." Also, even when "prediction (i.e., intra prediction)" is indicated, "intra prediction" may be proposed as an example of "prediction."

Technical features that are individually described in one drawing in the present disclosure may be implemented individually or simultaneously.

FIG. 1 schematically illustrates an example of a video/image coding system applicable to exemplary embodiments of the present document.

Referring to FIG. 1, a video/image coding system may include a source device and a receiving device. The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
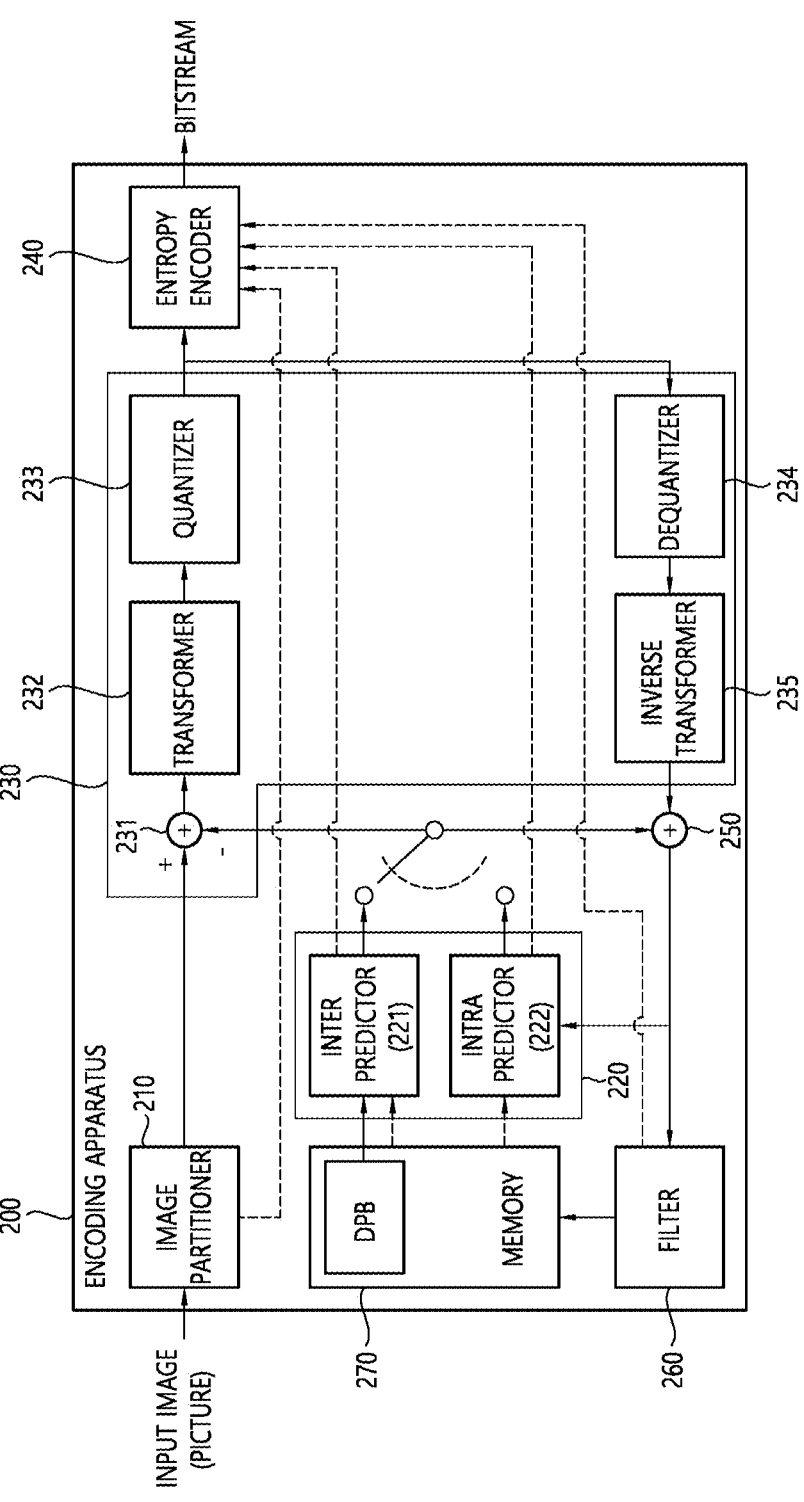
FIG. 2 is a diagram for schematically explaining a configuration of a video/image encoding apparatus applicable to the exemplary embodiments of the present document.

FIG. 2 is a diagram for schematically explaining a configuration of a video/image encoding apparatus applicable to the exemplary embodiments of the present document. In what follows, a video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

The subtractor 231 subtracts a prediction signal (a predicted block, prediction samples, or a prediction sample array) output from the predictor 220 from an input image signal (an original block, original samples, or an original sample array) to generate a residual signal (a residual block, residual samples, or a residual sample array). The generated residual signal is transmitted to the transformer 232. The predictor 220 may perform prediction on a target processing block (in what follows, it is referred to as a current block) and generate a predicted block including prediction samples for the current block. The predictor 220 may determine whether intra prediction or inter prediction is applied in the current block or CU units. As described later in the description of each prediction mode, the predictor may generate various information on prediction such as the prediction mode information and transmit the generated information to the entropy encoder 240. The prediction information may be encoded by the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). Also, the predictor 220 may perform intra block copy (IBC) to predict a block. The intra block copy may be used for image/video content coding of a game, such as the screen content coding (SCC). The IBC basically performs prediction in the current picture but may be performed similarly to inter prediction in that a reference block is derived in the current picture. That is, the IBC may use at least one of the inter prediction techniques described in this document.

The prediction signal generated by the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements described later may be encoded through the encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, a residual signal (a residual block or residual samples) may be reconstructed by applying dequantization and inverse transform to the quantized transform coefficients through the dequantizer 234 and the inverse transformer 235. The adder 250 may generate a reconstructed signal (a reconstructed picture, a reconstructed block, reconstructed samples, or a reconstructed sample array) by adding the reconstructed residual signal to a prediction signal output from the predictor 220. When there is no residual for a target processing block, such as a case in which the skip mode is applied, the predicted block may be used as a reconstructed block. The generated reconstructed signal may be used for intra prediction of the next target processing block within the current picture or may be used for inter prediction of the next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Meanwhile, image/video coding according to the present disclosure may include multilayer-based image/video coding. The multilayer-based image/video coding may include scalable coding. The multilayer-based coding or scalable coding may process input signals for each layer. Input signals (input image/picture) may differ in at least one of resolution, frame rate, bit-depth, color format, aspect ratio, and view depending on the layers. In this case, it is possible to reduce repeated transmission/processing of information and increase compression efficiency by performing prediction between layers using a difference between layers, namely, based on scalability.

Figure 3:
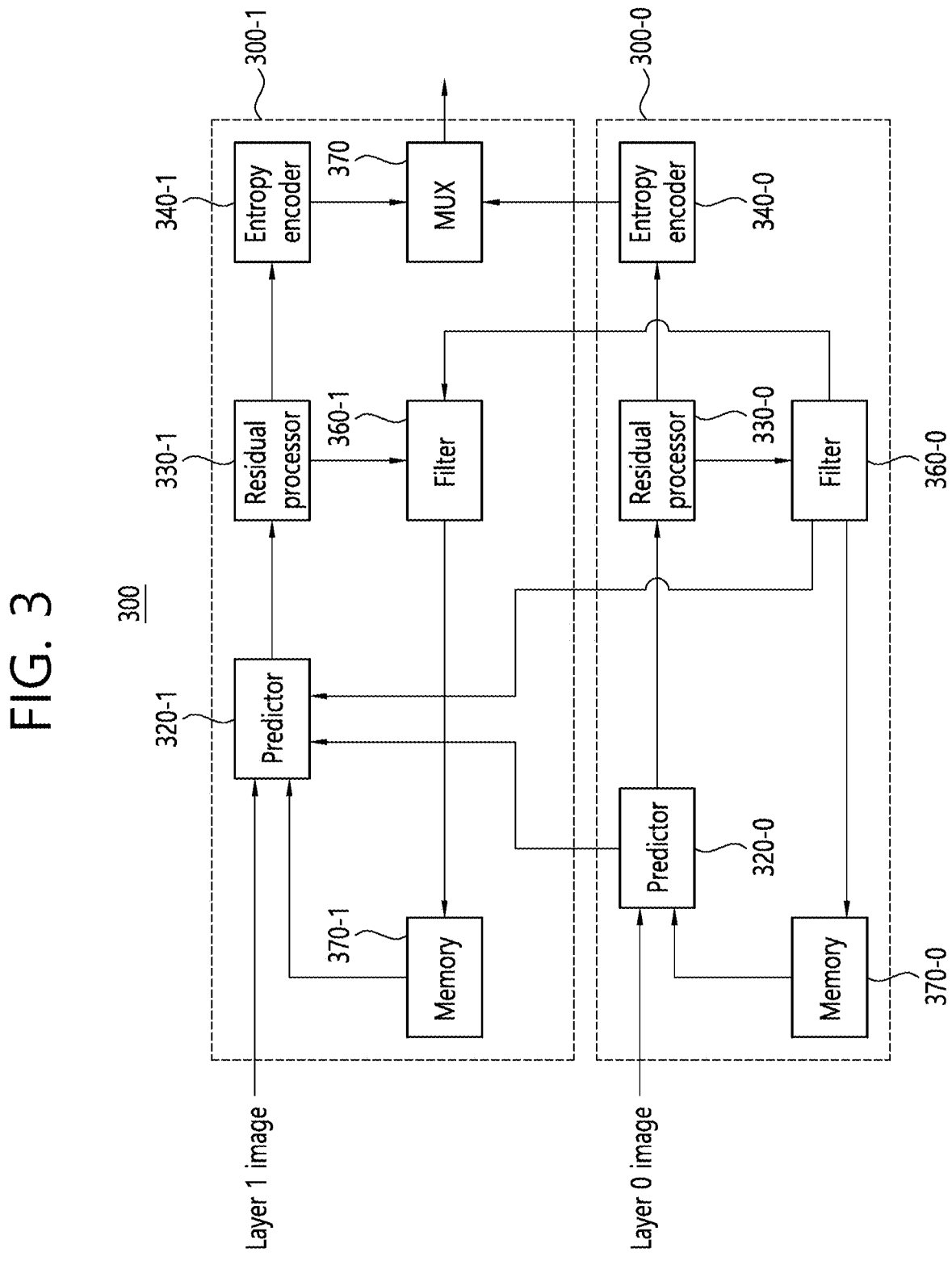
FIG. 3 is a block diagram of an encoding apparatus performing multilayer-based encoding of a video/image signal according to an embodiment(s) of the present disclosure.

FIG. 3 is a block diagram of an encoding apparatus performing multilayer-based encoding of a video/image signal according to an embodiment(s) of the present disclosure. The encoding apparatus of FIG. 3 may include the encoding apparatus of FIG. 2. In FIG. 3, the image partitioner and the adder are omitted. However, the encoding apparatus may include the image partitioner and the adder. In this case, the image partitioner and the adder may be included in layer units. The present figure mainly describes multilayer-based prediction. Descriptions other than that may consult the descriptions given with reference to FIG. 2.

The example of FIG. 3 assumes a multilayer structure consisting of two layers for the convenience of description. However, embodiments of the present disclosure are not limited to the specific example, and it should be noted that the multilayer structure to which the embodiments of the present disclosure are applied may include two or more layers.

Referring to FIG. 3, the encoding apparatus 300 includes an encoder 300-1 for layer 1 and an encoder 300-0 for layer 0.

Layer 0 may be a base layer, a reference layer, or a lower layer; layer 1 may be an enhancement layer, a current layer, or a higher layer.

The encoder 300-1 of layer 1 includes a predictor 320-1, a residual processor 330-1, a filter 360-1, a memory 370-1, an entropy encoder 340-1, and a multiplexer (MUX) 370. The MUX may be included as an external component.

The encoder 200-0 of layer 0 includes a predictor 320-0, a residual processor 330-0, a filter 360-0, a memory 370-0, and an entropy encoder 340-0.

The predictor 320-0, 320-1 may perform prediction on the input image based on various prediction techniques as described above. For example, the predictor 320-0, 320-1 may perform inter prediction and intra prediction. The predictor 320-0, 320-1 may perform prediction in predetermined processing units. A prediction unit may be a coding unit (CU) or a transform unit (TU). A predicted block (including prediction samples) may be generated according to a prediction result, and the residual processor may derive a residual block (including residual samples) based on the predicted block.

Through inter prediction, a prediction block may be generated by performing prediction based on the information on at least one of a preceding picture and/or a succeeding picture of the current picture. Through intra prediction, a prediction block may be generated by performing prediction based on neighboring samples within the current picture.

Various prediction mode methods described above may be used for an inter prediction mode or method. Inter prediction may select a reference picture with respect to a current block to be predicted and a reference block related to the current block within the reference picture. The predictor 320-0, 320-1 may generate a predicted block based on the reference block.

Also, the predictor 320-1 may perform prediction on layer 1 using the information of layer 0. In the present disclosure, a method of predicting information of a current layer using the information of another layer is referred to as inter-layer prediction for the convenience of description.

Information of the current layer predicted based on the information of another layer (i.e., predicted by inter-layer prediction) includes at least one of texture, motion information, unit information, and predetermined parameters (e.g., filtering parameters).

Also, information of another layer used for prediction of the current layer (i.e., used for inter-layer prediction) may include at least one of texture, motion information, unit information, and predetermined parameters (e.g., filtering parameters).

In inter-layer prediction, a current block may be a block within the current picture of a current layer (e.g., layer 1) and may be a target block to be coded. A reference block may be a block within a picture (reference picture) belonging to the same access unit (AU) as the picture (current picture) to which the current block belongs in a layer (reference layer, for example, layer 0) referenced for prediction of the current block and may be a block corresponding to the current block. Here, the access unit may be a set of picture units (PUs) including encoded pictures related to the same time output from different layers and the DPB. A picture unit may be a set of NAL units related to each other according to a specific classification rule, consecutive in decoding order, and containing only one encoded picture. A coded video sequence (CVS) may be a set of AUs.

One example of inter-layer prediction is inter-layer motion prediction that predicts motion information of a current layer using motion information of a reference layer. According to inter-layer motion prediction, motion information of a current block may be predicted based on the motion information of a reference block. In other words, in deriving motion information based on the inter prediction mode to be described later, a motion information candidate may be derived using the motion information of an inter-layer reference block instead of a temporal neighboring block.

When inter-layer motion prediction is applied, the predictor 320-1 may scale and use the reference block (i.e., inter-layer reference block) motion information of the reference layer.

In another example of inter-layer prediction, inter-layer texture prediction may use the texture of a reconstructed reference block as a prediction value for the current block. In this case, the predictor 320-1 may scale the texture of the reference block through upsampling. Inter-layer texture prediction may be called inter-layer (reconstructed) sample prediction or simply inter-layer prediction.

In inter-layer parameter prediction, which is yet another example of inter-layer prediction, a parameter derived from the reference layer may be reused in the current layer, or a parameter for the current layer may be derived based on the parameter used in the reference layer.

In inter-layer residual prediction, which is still another example of inter-layer prediction, residuals of the current layer may be predicted using residual information of another layer, and prediction for the current block may be performed based on the predicted residuals.

In inter-layer differential prediction, which is yet still another example of inter-layer prediction, prediction for the current block may be performed using a difference between images obtained by upsampling or downsampling of a reconstructed picture of the current layer and a reconstructed picture of the reference layer.

In inter-layer syntax prediction, which is still yet another example of inter-layer prediction, the texture of a current block may be predicted or generated using syntax information of the reference layer. In this case, the syntax information of the referenced reference layer may include information on the intra prediction mode and motion information.

When predicting a specific block, a plurality of prediction methods using the inter-layer prediction may use multiple layers.

Here, as examples of inter-layer prediction, inter-layer texture prediction, inter-layer motion prediction, inter-layer unit information prediction, inter-layer parameter prediction, inter-layer residual prediction, inter-layer differential prediction, and inter-layer syntax prediction have been described; however, inter-layer prediction applicable to the present disclosure is not limited to the examples above.

For example, inter-layer prediction may be applied as an extension of inter prediction for the current layer. In other words, inter prediction for the current block may be performed by including a reference picture derived from the reference layer in the reference pictures that may be referenced for inter prediction of the current block.

In this case, the inter-layer reference picture may be included in a reference picture list for the current block. Using the inter-layer reference picture, the predictor 320-1 may perform inter prediction on the current block.

Here, the inter-layer reference picture may be a reference picture constructed by sampling a reconstructed picture of the reference layer to correspond to the current layer. Therefore, when the reconstructed picture of the reference layer corresponds to a picture of the current layer, the reconstructed picture of the reference layer may be used as the inter-layer reference picture without sampling. For example, when the width and height of samples in a reconstructed picture of the reference layer are the same as those of samples in a reconstructed picture of the current layer; and the offsets between the upper left, upper right, lower left, and lower right of a picture of the reference layer and the upper left, upper right, lower left, and lower right of a picture of the current layer are 0, the reconstructed picture of the reference layer may be used as the inter-layer reference picture of the current layer without re-sampling.

Also, the reconstructed picture of the reference layer from which the inter-layer reference picture is derived may be a picture belonging to the same AU as the current picture to be encoded.

When inter prediction for the current block is performed by including an inter-layer reference picture in the reference picture list, the positions of the inter-layer reference picture within the reference picture list L0 and L1 may be different from each other. For example, in the case of the reference picture list L0, the inter-layer reference picture may be located after short-term reference pictures before the current picture, and in the case of the reference picture list L1, the inter-layer reference picture may be located at the end of the reference picture list.

Here, the reference picture list L0 is a reference picture list used for inter prediction of a P slice or a reference picture list used as a first reference picture list in inter prediction of a B slice. The reference picture list L1 is a second reference picture list used for inter prediction of a B slice.

Therefore, the reference picture list L0 may be composed in the order of a short-term reference picture(s) before the current picture, an inter-layer reference picture, a short-term reference picture(s) after the current picture, and a long-term reference picture. The reference picture list L1 may be composed in the order of a short-term reference picture(s) after the current picture, a short-term reference picture(s) before the current picture, a long-term reference picture, and an inter-layer reference picture.

At this time, a predictive slice (P slice) is a slice on which intra prediction is performed or inter prediction is performed using up to one motion vector and reference picture index per prediction block. A bi-predictive slice (B slice) is a slice on which intra prediction is performed, or prediction is performed using up to two motion vectors and reference picture indexes per prediction block. In this regard, an intra slice (I slice) is a slice to which only intra prediction is applied.

Also, when inter prediction for the current block is performed based on the reference picture list including an inter-layer reference picture, the reference picture list may include a plurality of inter-layer reference pictures derived from a plurality of layers.

When the reference picture list includes a plurality of inter-layer reference pictures, inter-layer reference pictures may be cross-arranged within the reference picture list L0 and L1. For example, suppose that two inter-layer reference pictures, an inter-layer reference picture $ILRP_i$, and an inter-layer reference picture $ILRP_j$ are included in the reference picture list used for inter prediction of the current block. In this case, in the reference picture list L0, $ILRP_i$ may be located after short-term reference pictures before the current picture, and $ILRP_j$ may be located at the end of the list. Also, in the reference picture list L1, $ILRP_i$ may be located at the end of the list, and $ILRP_j$ may be located after short-term reference pictures after the current picture.

In this case, the reference picture list L0 may be composed in the order of the short-term reference picture(s) before the current picture, the inter-layer reference picture $ILRP_i$, the short-term reference picture(s) after the current picture, the long-term reference picture, and the inter-layer reference picture $ILRP_j$. The reference picture list L1 may be composed in the order of the short-term reference picture(s) after the current picture, the inter-layer reference picture $ILRP_j$, the short-term reference picture(s) before the current picture, the long-term reference picture, and the inter-layer reference picture $ILRP_i$.

Also, one of the two inter-layer reference pictures may be an inter-layer reference picture derived from a scalable layer related to resolution, and the other may be an inter-layer reference picture derived from a layer providing a different view. In this case, for example, suppose $ILRP_i$ is an inter-layer reference picture derived from a layer that provides a different resolution, and $ILRP_j$ is an inter-layer reference picture derived from a layer that provides a different view. Then, in the case of scalable video coding that supports only scalability except for a view, the reference picture list L0 may be composed in the order of the short-term reference picture(s) before the current picture, the inter-layer reference picture $ILRP_i$, the short-term reference picture(s) after the current picture, and the long-term reference picture. On the other hand, the reference picture list L1 may be composed in the order of the short-term reference picture(s) after the current picture, the short-term reference picture(s) before the current picture, the long-term reference picture, and the inter-layer reference picture $ILRP_i$.

Meanwhile, for inter-layer prediction, the information of an inter-layer reference picture may be composed of only a sample value, only motion information (motion vector), or both the sample value and the motion information. When the reference picture index indicates the inter-layer reference picture, the predictor 320-1 uses only the sample value of the inter-layer reference picture, motion information (motion vector) of the inter-layer reference picture, or both of the sample value and the motion information of the inter-layer reference picture according to the information received from the encoding apparatus.

When only the sample values of the inter-layer reference picture are used, the predictor 320-1 may derive samples of a block specified by a motion vector in the inter-layer reference picture as prediction samples of the current block. In the case of scalable video coding that does not consider a view, the motion vector in inter prediction (inter-layer prediction) using the inter-layer reference picture may be set to a fixed value (for example, 0).

When only the motion information of an inter-layer reference picture is used, the predictor 320-1 may use a motion vector specified in the inter-layer reference picture as a motion vector predictor for deriving the motion vector of the current block. Also, the predictor 320-1 may use a motion vector specified in the inter-layer reference picture as the motion vector of the current block.

When both the samples and the motion information of the inter-layer reference picture are used, the predictor 320-1 may use the samples related to the current block in the inter-layer reference picture and the motion information (motion vector) specified in the inter-layer reference picture for prediction of the current block.

When inter-layer prediction is applied, the encoding apparatus may transmit a reference index indicating an inter-layer reference picture within the reference picture list to the decoding apparatus and also transmit, to the decoding apparatus, information that specifies which information (sample information, motion information, or sample information and motion information) to use from the inter-layer reference picture, namely, information that specifies dependency type of the dependency related to the inter-layer prediction between two layers.

Figure 4:
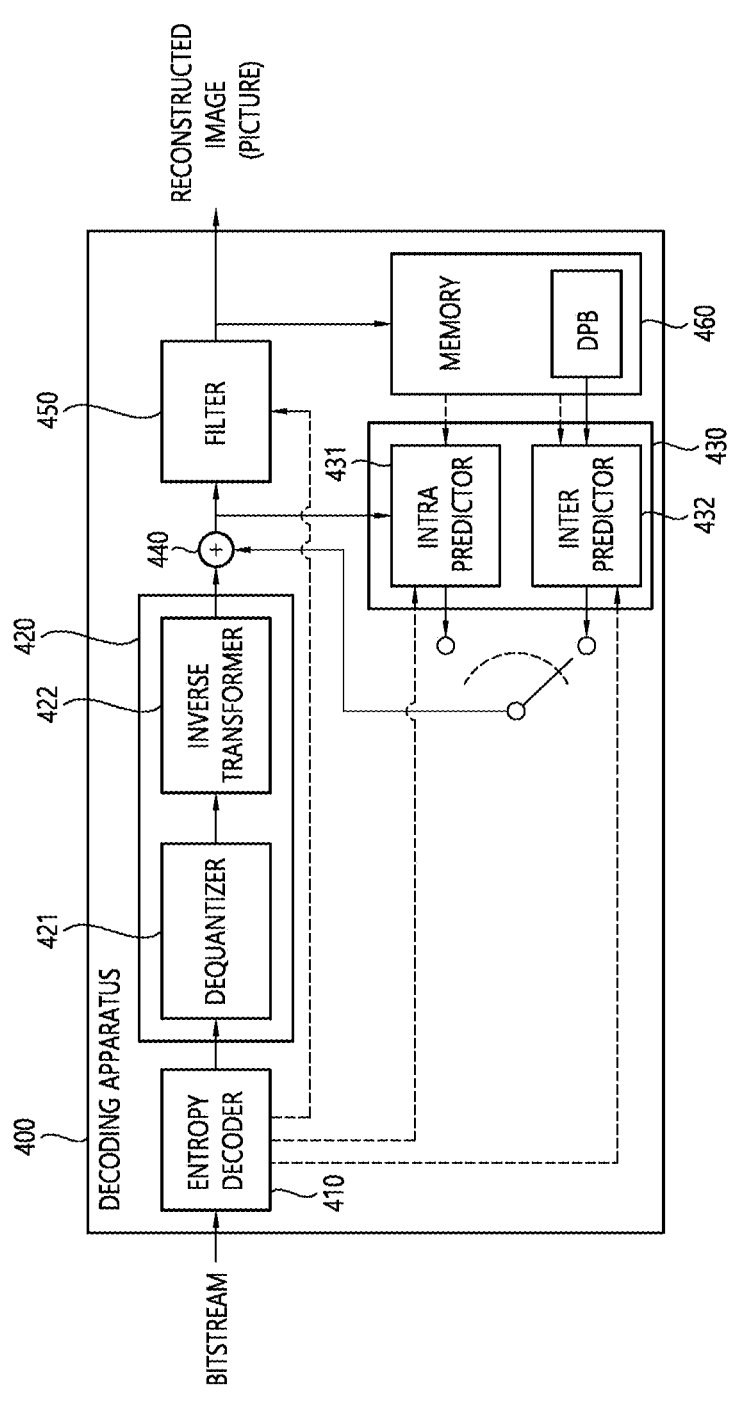
FIG. 4 is a diagram for schematically explaining a configuration of a video/image decoding apparatus applicable to the embodiments of the present disclosure.

FIG. 4 is a schematic diagram illustrating a configuration of a video/image decoding apparatus to which the embodiment(s) of the present document may be applied.

Referring to FIG. 3, the decoding apparatus 400 may include an entropy decoder 410, a residual processor 420, a predictor 430, an adder 440, a filter 450, a memory 460. The predictor 430 may include an inter predictor 431 and an intra predictor 432. The residual processor 420 may include a dequantizer 421 and an inverse transformer 421. The entropy decoder 410, the residual processor 420, the predictor 430, the adder 440, and the filter 450 may be configured by a hardware component (ex. a decoder chipset or a processor) according to an embodiment. In addition, the memory 460 may include a decoded picture buffer (DPB) or may be configured by a digital storage medium. The hardware component may further include the memory 460 as an internal/external component.

When a bitstream including video/image information is input, the decoding apparatus 400 may reconstruct an image corresponding to a process in which the video/image information is processed in the encoding apparatus of FIG. 2. For example, the decoding apparatus 400 may derive units/blocks based on block partition related information obtained from the bitstream. The decoding apparatus 400 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 400 may be reproduced through a reproducing apparatus.

The decoding apparatus 400 may receive a signal output from the encoding apparatus of FIG. 2 in the form of a bitstream, and the received signal may be decoded through the entropy decoder 410. For example, the entropy decoder 410 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 410 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 410 may be provided to the predictor (430), and information related to the residual value on which the entropy decoding was performed in the entropy decoder 410, that is, the quantized transform coefficients and related parameter information, may be input to the dequantizer (421). In addition, information on filtering among information decoded by the entropy decoder 410 may be provided to the filter 450. Meanwhile, a receiver (not shown) for receiving a signal output from the encoding apparatus may be further configured as an internal/external element of the decoding apparatus 400, or the receiver may be a component of the entropy decoder 410. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 410, and the sample decoder may include at least one of the dequantizer 421, the inverse transformer 422, the adder 440, the filter 450 and the memory 460.

The dequantizer 421 may dequantize the quantized transform coefficients and output the transform coefficients. The dequantizer 421 may rearrange the quantized transform coefficients in the form of a two-dimensional block form. In this case, the rearrangement may be performed based on the coefficient scanning order performed in the encoding apparatus. The dequantizer 421 may perform dequantization on the quantized transform coefficients by using a quantization parameter (ex. quantization step size information) and obtain transform coefficients.

The inverse transformer 422 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 410 and may determine a specific intra/inter prediction mode.

The predictor may generate a prediction signal based on various prediction methods to be described later. For example, the predictor may apply intra prediction or inter prediction for prediction of one block and apply intra prediction and inter prediction simultaneously. The latter operation may be called combined inter and intra prediction (CIIP). Also, the predictor may perform intra block copy (IBC) to predict a block. The intra block copy may be used for image/video content coding of a game, such as the screen content coding (SCC). IBC basically performs prediction within the current picture but may be performed similarly to inter prediction in that a reference block is derived within the current picture. In other words, IBC may use at least one of the inter prediction techniques described in the present disclosure.

The intra predictor 431 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 431 may determine the prediction mode applied to the current block by using the prediction mode applied to the neighboring block.

The inter predictor 432 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 432 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 440 may generate a reconstructed signal (reconstructed picture, reconstructed block, reconstructed sample array) by adding the obtained residual signal to the prediction signal (predicted block, predicted sample array) output from the predictor 430. If there is no residual for the block to be processed, such as when the skip mode is applied, the predicted block may be used as the reconstructed block.

The adder 440 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 450 may improve subjective/objective image quality by applying filtering to the reconstructed signal. For example, the filter 450 may generate a modified reconstructed picture by applying various filtering methods to the reconstructed picture and store the modified reconstructed picture in the memory 460, specifically, a DPB of the memory 460. The various filtering methods may include, for example, deblocking filtering, a sample adaptive offset, an adaptive loop filter, a bilateral filter, and the like.

The (modified) reconstructed picture stored in the DPB of the memory 460 may be used as a reference picture in the inter predictor 432. The memory 460 may store the motion information of the block from which the motion information in the current picture is derived (or decoded) and/or the motion information of the blocks in the picture that have already been reconstructed. The stored motion information may be transmitted to the inter predictor 431 so as to be utilized as the motion information of the spatial neighboring block or the motion information of the temporal neighboring block. The memory 460 may store reconstructed samples of reconstructed blocks in the current picture and transfer the reconstructed samples to the intra predictor 431.

In the present disclosure, the embodiments described based on the predictor 430, the dequantizer 421, the inverse transformer 422, and the filter 450 of the decoding apparatus 400 may be applied equally or to correspond to the predictor 220, the dequantizer 234, the inverse transformer 235, and the filter 260 of the encoding apparatus 200, respectively.

Figure 5:
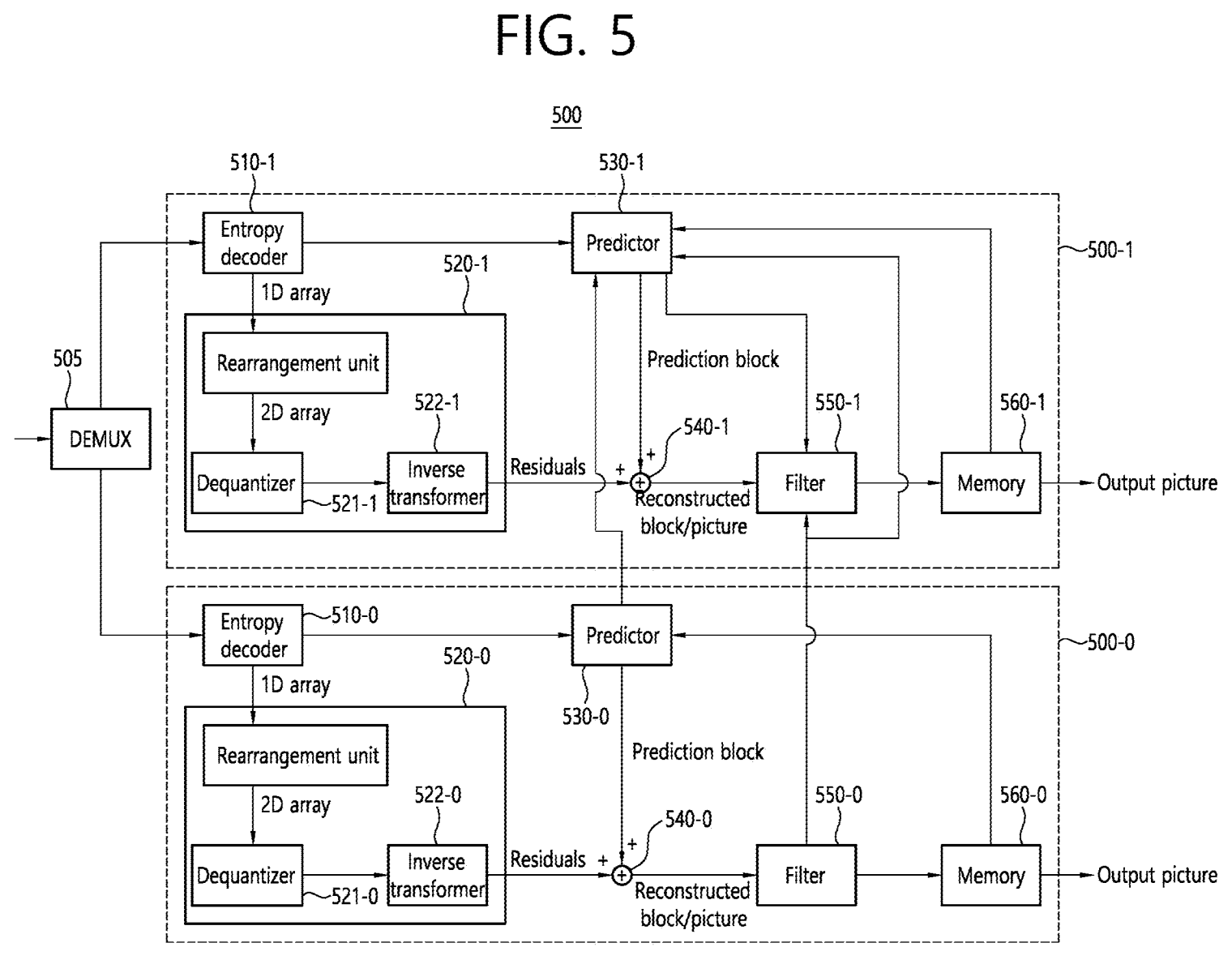

FIG. 5 is a block diagram of a decoding apparatus performing multilayer-based decoding of a video/image signal according to an embodiment(s) of the present disclosure. The decoding apparatus of FIG. 5 may include the decoding apparatus of FIG. 4. In FIG. 5, the rearrangement unit may be omitted or may be included in the dequantizer. The present figure mainly describes multilayer-based prediction. Descriptions other than that may consult the descriptions given with reference to FIG. 4.

The example of FIG. 5 assumes a multilayer structure consisting of two layers for the convenience of description. However, embodiments of the present disclosure are not limited to the specific example, and it should be noted that the multilayer structure to which the embodiments of the present disclosure are applied may include two or more layers.

Referring to FIG. 5, the decoding apparatus 500 includes a decoder 500-1 for layer 1 and a decoder 500-0 for layer 0.

The decoder 500-1 of layer 1 may include an entropy decoder 510-1, a residual processor 520-1, a predictor 530-1, an adder 540-1, a filter 550-1 and a memory 560-1.

The decoder 500-0 of layer 0 may include an entropy decoder 510-0, a residual processor 520-0, a predictor 530-0, an adder 540-0, a filter 550-0 and a memory 560-0.

When a bitstream including image information is transmitted from the encoding apparatus, DEMUX 505 may demultiplex the information for each layer and deliver the information to the decoding apparatus for each layer.

The entropy decoder 510-1, 510-0 may perform decoding according to the coding method used in the encoding apparatus. For example, when CABAC is used in the encoding apparatus, the entropy decoder 510-1, 510-0 may also perform entropy decoding based on CABAC.

When the prediction mode for a current block is the intra prediction mode, the predictor 530-1, 530-0 may perform intra prediction on the current block based on neighboring reconstructed samples within the current picture.

When the prediction mode for the current block is an inter prediction mode, the predictor 530-1, 530-0 may perform inter prediction on the current block based on the information included in at least one of a picture before the current picture or a picture after the current picture. The information received from the encoding device may be checked, and part or all of the motion information required for inter prediction may be derived based on the checked information.

When the skip mode is applied as the inter prediction mode, residuals may not be transmitted from the encoding apparatus, and the prediction block may be used as a reconstructed block.

Meanwhile, the predictor 530-1 of layer 1 may perform inter prediction or intra prediction using only the information within layer 1 or may perform inter-layer prediction using the information of another layer (layer 0).

Information of the current layer predicted using the information of a different layer (i.e., predicted by inter-layer prediction) includes at least one of texture, motion information, unit information, and predetermined parameters (e.g., filtering parameters).

Also, information of the different layer used for prediction of the current layer (i.e., used for inter-layer prediction) may include at least one of texture, motion information, unit information, and predetermined parameters (e.g., filtering parameters).

In inter-layer prediction, a current block may be a block within the current picture of a current layer (e.g., layer 1) and may be a target block to be decoded. A reference block may be a block within a picture (reference picture) belonging to the same access unit (AU) as the picture (current picture) to which the current block belongs in a layer (reference layer, for example, layer 0) referenced for prediction of the current block and may be a block corresponding to the current block.

One example of inter-layer prediction is inter-layer motion prediction that predicts motion information of a current layer using motion information of a reference layer. According to inter-layer motion prediction, motion information of a current block may be predicted based on the motion information of a reference block. In other words, in deriving motion information based on the inter prediction mode to be described later, a motion information candidate may be derived using the motion information of an inter-layer reference block instead of a temporal neighboring block.

When inter-layer motion prediction is applied, the predictor 530-1 may scale and use the reference block (i.e., inter-layer reference block) motion information of the reference layer.

In another example of inter-layer prediction, inter-layer texture prediction may use the texture of a reconstructed reference block as a prediction value for the current block. In this case, the predictor 530-1 may scale the texture of the reference block through upsampling. Inter-layer texture prediction may be called inter-layer (reconstructed) sample prediction or simply inter-layer prediction.

In inter-layer parameter prediction, which is yet another example of inter-layer prediction, a parameter derived from the reference layer may be reused in the current layer, or a parameter for the current layer may be derived based on the parameter used in the reference layer.

In inter-layer residual prediction, which is still another example of inter-layer prediction, residuals of the current layer may be predicted using residual information of another layer, and prediction for the current block may be performed based on the predicted residuals.

In inter-layer differential prediction, which is yet still another example of inter-layer prediction, prediction for the current block may be performed using a difference between images obtained by upsampling or downsampling of a reconstructed picture of the current layer and a reconstructed picture of the reference layer.

In inter-layer syntax prediction, which is still yet another example of inter-layer prediction, the texture of a current block may be predicted or generated using syntax information of the reference layer. In this case, the syntax information of the referenced reference layer may include information on the intra prediction mode and motion information.

When predicting a specific block, a plurality of prediction methods using the inter-layer prediction may use multiple layers.

Here, as examples of inter-layer prediction, inter-layer texture prediction, inter-layer motion prediction, inter-layer unit information prediction, inter-layer parameter prediction, inter-layer residual prediction, inter-layer differential prediction, and inter-layer syntax prediction have been described; however, inter-layer prediction applicable to the present disclosure is not limited to the examples above.

For example, inter-layer prediction may be applied as an extension of inter prediction for the current layer. In other words, inter prediction for the current block may be performed by including a reference picture derived from the reference layer in the reference pictures that may be referenced for inter prediction of the current block.

When the reference picture index received from the encoding apparatus or the reference picture index derived from neighboring blocks indicates an inter-layer reference picture within the reference picture list, the predictor 530-1 may perform inter-layer prediction using the inter-layer reference picture. For example, when the reference picture index indicates the inter-layer reference picture, the predictor 530-1 may derive sample values of a region specified by a motion vector in the inter-layer reference picture as a prediction block for the current block.

In this case, the inter-layer reference picture may be included in a reference picture list for the current block. Using the inter-layer reference picture, the predictor 530-1 may perform inter prediction on the current block.

Here, the inter-layer reference picture may be a reference picture constructed by sampling a reconstructed picture of the reference layer to correspond to the current layer. Therefore, when the reconstructed picture of the reference layer corresponds to a picture of the current layer, the reconstructed picture of the reference layer may be used as the inter-layer reference picture without sampling. For example, when the width and height of samples in a reconstructed picture of the reference layer are the same as those of samples in a reconstructed picture of the current layer; and the offsets between the upper left, upper right, lower left, and lower right of a picture of the reference layer and the upper left, upper right, lower left, and lower right of a picture of the current layer are 0, the reconstructed picture of the reference layer may be used as the inter-layer reference picture of the current layer without re-sampling.

Also, the reconstructed picture of the reference layer from which the inter-layer reference picture is derived may be a picture belonging to the same AU as the current picture to be encoded. When inter prediction for the current block is performed by including an inter-layer reference picture in the reference picture list, the positions of the inter-layer reference picture within the reference picture list L0 and L1 may be different from each other. For example, in the case of the reference picture list L0, the inter-layer reference picture may be located after short-term reference pictures before the current picture, and in the case of the reference picture list L1, the inter-layer reference picture may be located at the end of the reference picture list.

Here, the reference picture list L0 is a reference picture list used for inter prediction of a P slice or a reference picture list used as a first reference picture list in inter prediction of a B slice. The reference picture list L1 is a second reference picture list used for inter prediction of a B slice.

Therefore, the reference picture list L0 may be composed in the order of a short-term reference picture(s) before the current picture, an inter-layer reference picture, a short-term reference picture(s) after the current picture, and a long-term reference picture. The reference picture list L1 may be composed in the order of a short-term reference picture(s) after the current picture, a short-term reference picture(s) before the current picture, a long-term reference picture, and an inter-layer reference picture.

At this time, a predictive slice (P slice) is a slice on which intra prediction is performed or inter prediction is performed using up to one motion vector and reference picture index per prediction block. A bi-predictive slice (B slice) is a slice on which intra prediction is performed, or prediction is performed using up to two motion vectors and reference picture indexes per prediction block. In this regard, an intra slice (I slice) is a slice to which only intra prediction is applied.

Also, when inter prediction for the current block is performed based on the reference picture list including an inter-layer reference picture, the reference picture list may include a plurality of inter-layer reference pictures derived from a plurality of layers.

When the reference picture list includes a plurality of inter-layer reference pictures, inter-layer reference pictures may be cross-arranged within the reference picture list L0 and L1. For example, suppose that two inter-layer reference pictures, an inter-layer reference picture $ILRP_i$, and an inter-layer reference picture $ILRP_j$ are included in the reference picture list used for inter prediction of the current block. In this case, in the reference picture list L0, $ILRP_i$ may be located after short-term reference pictures before the current picture, and $ILRP_j$ may be located at the end of the list. Also, in the reference picture list L1, $ILRP_i$ may be located at the end of the list, and $ILRP_j$ may be located after short-term reference pictures after the current picture.

In this case, the reference picture list L0 may be composed in the order of the short-term reference picture(s) before the current picture, the inter-layer reference picture $ILRP_i$, the short-term reference picture(s) after the current picture, the long-term reference picture, and the inter-layer reference picture $ILRP_j$. The reference picture list L1 may be composed in the order of the short-term reference picture(s) after the current picture, the inter-layer reference picture $ILRP_j$, the short-term reference picture(s) before the current picture, the long-term reference picture, and the inter-layer reference picture $ILRP_i$.

Also, one of the two inter-layer reference pictures may be an inter-layer reference picture derived from a scalable layer related to resolution, and the other may be an inter-layer reference picture derived from a layer providing a different view. In this case, for example, suppose $ILRP_i$ is an inter-layer reference picture derived from a layer that provides a different resolution, and $ILRP_j$ is an inter-layer reference picture derived from a layer that provides a different view. Then, in the case of scalable video coding that supports only scalability except for a view, the reference picture list L0 may be composed in the order of the short-term reference picture(s) before the current picture, the inter-layer reference picture $ILRP_i$, the short-term reference picture(s) after the current picture, and the long-term reference picture. On the other hand, the reference picture list L1 may be composed in the order of the short-term reference picture(s) after the current picture, the short-term reference picture(s) before the current picture, the long-term reference picture, and the inter-layer reference picture $ILRP_i$.

Meanwhile, for inter-layer prediction, the information of an inter-layer reference picture may be composed of only a sample value, only motion information (motion vector), or both the sample value and the motion information. When the reference picture index indicates the inter-layer reference picture, the predictor 530-1 uses only the sample value of the inter-layer reference picture, motion information (motion vector) of the inter-layer reference picture, or both of the sample value and the motion information of the inter-layer reference picture according to the information received from the encoding apparatus.

When only the sample values of the inter-layer reference picture are used, the predictor 530-1 may derive samples of a block specified by a motion vector in the inter-layer reference picture as prediction samples of the current block. In the case of scalable video coding that does not consider a view, the motion vector in inter prediction (inter-layer prediction) using the inter-layer reference picture may be set to a fixed value (for example, 0).

When only the motion information of an inter-layer reference picture is used, the predictor 530-1 may use a motion vector specified in the inter-layer reference picture as a motion vector predictor for deriving the motion vector of the current block. Also, the predictor 530-1 may use a motion vector specified in the inter-layer reference picture as the motion vector of the current block.

When both the samples and the motion information of the inter-layer reference picture are used, the predictor 530-1 may use the samples related to the current block in the inter-layer reference picture and the motion information (motion vector) specified in the inter-layer reference picture for prediction of the current block.

The decoding apparatus may receive a reference index indicating an inter-layer reference picture within the reference picture list from the encoding apparatus and perform inter-layer prediction based on the received reference index. Also, the decoding apparatus may receive, from the encoding apparatus, information that specifies which information (sample information, motion information, or sample information and motion information) to use from the inter-layer reference picture, namely, information that specifies dependency type of the dependency related to the inter-layer prediction between two layers.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

In the present disclosure, at least one of quantization/dequantization and/or transform/inverse transform may be omitted. When the quantization/dequantization is omitted, the quantized transform coefficients may be called transform coefficients. When the transform/inverse transform is omitted, the transform coefficients may be called coefficients or residual coefficients or may still be called transform coefficients to unify the expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on the inverse transform (transform) of the scaled transform coefficients. The descriptions above may be applied to/expressed in other parts of the present disclosure in the same context.

The predictor of the encoding/decoding apparatus may derive a prediction sample by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index. In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information. In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list may be configured based on the neighboring blocks of the current block and a flag or index information indicating which candidate is selected (used) may be signaled in order to derive the motion vector and/or reference picture index of the current block. The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference may be signaled. In this case, the motion vector of the current block may be derived by using a sum of the motion vector predictor and the motion vector difference.

The motion information may further include L0 motion information and/or L1 motion information according to the inter-prediction type (L0 prediction, L1 prediction, Bi prediction, etc.). A L0-direction motion vector may be referred to as an L0 motion vector or MVL0 and an L1-direction motion vector may be referred to as an L1 motion vector or MVL1. A prediction based on the L0 motion vector may be referred to as an L0 prediction, a prediction based on the L1 motion vector may be referred to as an L1 prediction, and a prediction based on both the L0 motion vector and the L1 motion vector may be referred to as a bi-prediction. Here, the L0 motion vector may indicate a motion vector associated with a reference picture list L0 and the L1 motion vector may indicate a motion vector associated with a reference picture list L1. The reference picture list L0 may include pictures prior to the current picture in an output order and the reference picture list L1 may include pictures subsequent to the current picture in the output order, as the reference pictures. The prior pictures may be referred to as a forward (reference) picture and the subsequent pictures may be referred to as a reverse (reference) picture. The reference picture list L0 may further include the pictures subsequent to the current picture in the output order as the reference pictures. In this case, the prior pictures may be first indexed in the reference picture list L0 and the subsequent pictures may then be indexed. The reference picture list L1 may further include the pictures prior to the current picture in the output order as the reference pictures. In this case, the subsequent pictures may be first indexed in the reference picture list L1 and the prior pictures may then be indexed. Here, the output order may correspond to a picture order count (POC) order.

Figure 6:
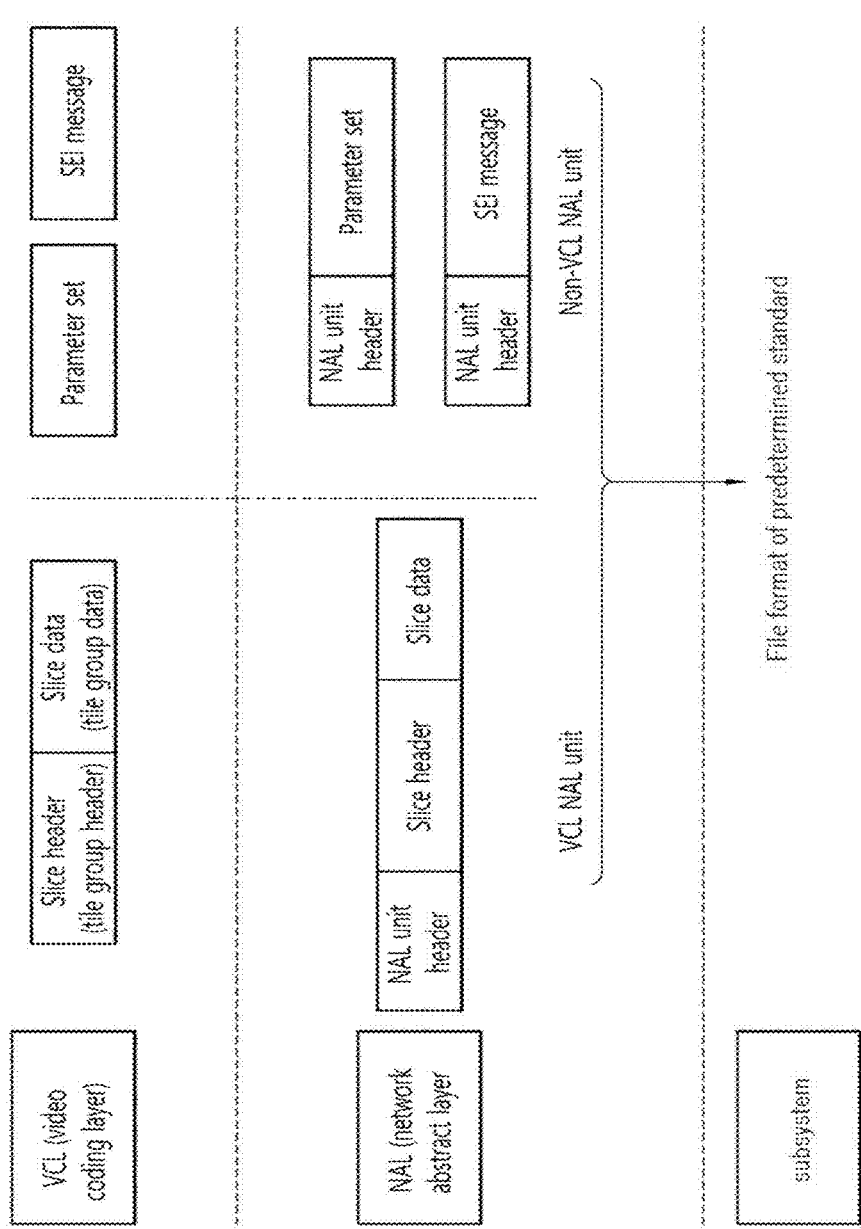
FIG. 6 exemplarily shows a hierarchical structure for a coded image/video.

FIG. 6 exemplarily shows a hierarchical structure for a coded image/video.

Referring to FIG. 6, coded image/video is divided into a video coding layer (VCL) that handles the decoding process of the image/video and itself, a subsystem that transmits and stores the coded information, and NAL (network abstraction layer) in charge of function and present between the VCL and the subsystem.

In the VCL, VCL data including compressed image data (slice data) is generated, or a parameter set including a picture parameter set (PSP), a sequence parameter set (SPS), and a video parameter set (VPS) or a supplemental enhancement information (SEI) message additionally required for an image decoding process may be generated.

In the NAL, a NAL unit may be generated by adding header information (NAL unit header) to a raw byte sequence payload (RBSP) generated in a VCL. In this case, the RBSP refers to slice data, parameter set, SEI message, etc., generated in the VCL. The NAL unit header may include NAL unit type information specified according to RBSP data included in the corresponding NAL unit.

As shown in the figure, the NAL unit may be classified into a VCL NAL unit and a Non-VCL NAL unit according to the RBSP generated in the VCL. The VCL NAL unit may mean a NAL unit that includes information on the image (slice data) on the image, and the Non-VCL NAL unit may mean a NAL unit that includes information (parameter set or SEI message) required for decoding the image.

The above-described VCL NAL unit and Non-VCL NAL unit may be transmitted through a network by attaching header information according to the data standard of the subsystem. For example, the NAL unit may be transformed into a data format of a predetermined standard such as an H.266/VVC file format, a real-time transport protocol (RTP), a transport stream (TS), etc., and transmitted through various networks.

As described above, the NAL unit may be specified with the NAL unit type according to the RBSP data structure included in the corresponding NAL unit, and information on the NAL unit type may be stored and signaled in the NAL unit header.

For example, the NAL unit may be classified into a VCL NAL unit type and a Non-VCL NAL unit type according to whether the NAL unit includes information (slice data) about an image. The VCL NAL unit type may be classified according to the nature and type of pictures included in the VCL NAL unit, and the Non-VCL NAL unit type may be classified according to types of parameter sets.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The aforementioned NAL unit types may have syntax information for the NAL unit type, and the syntax information may be stored and signaled in a NAL unit header. For example, the syntax information may be nal_unit_type, and NAL unit types may be specified by a nal_unit_type value.

A layer may include NAL units. For example, one layer may include VCL NAL units having a specific layer ID and non-VCL NAL units related to the VCL NAL units. A picture unit (PU) may include NAL units and a picture (encoded picture). An access unit (AU) may include picture units belonging to different layers and including pictures (encoded pictures) output from the DPB and related to the same time. A picture unit.

Meanwhile, as described above, one picture may include a plurality of slices, and one slice may include a slice header and slice data. In this case, one picture header may be further added to a plurality of slices (a slice header and a slice data set) within one picture. The picture header (picture header syntax) may include information/parameters commonly applicable to the picture. A slice may be mixed or replaced with a tile group in the present disclosure. Also, a slice header may be mixed or replaced with a type group header in the present disclosure.

The slice header (slice header syntax, slice header information) may include information/parameters that may be commonly applied to the slice. The APS (APS syntax) or the PPS (PPS syntax) may include information/parameters that may be commonly applied to one or more slices or pictures. The SPS (SPS syntax) may include information/parameters that may be commonly applied to one or more sequences. The VPS (VPS syntax) may include information/parameters that may be commonly applied to multiple layers. The DPS (DPS syntax) may include information/parameters that may be commonly applied to the overall video. The DPS may include information/parameters related to concatenation of a coded video sequence (CVS). The high level syntax (HLS)

in the present document may include at least one of the APS syntax, the PPS syntax, the SPS syntax, the VPS syntax, the DPS syntax, and the slice header syntax.

In the present document, the image/image information encoded from the encoding apparatus and signaled to the decoding apparatus in the form of a bitstream includes not only partitioning related information in a picture, intra/inter prediction information, residual information, in-loop filtering information, etc, but also information included in a slice header, information included in the APS, information included in the PPS, information included in an SPS, and/or information included in the VPS. In addition, the image/video information may further include NAL unit header information.

According to one embodiment of the present disclosure, a bitstream received by the decoding apparatus may include the syntax information and/or semantics information included in the following tables.

Table 1 shows an example of the picture header syntax.

TABLE 1

| | Descriptor |
|---|---|
| picture_header_structure( ) { | |
|   gdr_or_irap_pic_flag | u(1) |
|   if( gdr_or_irap_pic_flag ) | |
|     gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |
|     no_output_of_prior_pics_flag | u(1) |
|   if( gdr_pic_flag ) | |
|     recovery_poc_cnt | ue(v) |
|   for( i = 0; i < NumExtraPhBits; i++ ) | |
|     ph_extra_bit[ i ] | u(1) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_alf_enabled_flag && alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 ) | |
|         ph_alf_chroma_idc | u(2) |
|       if( ph_alf_chroma_idc > 0 ) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_cb_enabled_flag ) | |
|           ph_cc_alf_cb_aps_id | u(3) |
|         ph_cc_alf_cr_enabled_flag | u(1) |
|         if( ph_cc_alf_cr_enabled_flag ) | |
|           ph_cc_alf_cr_aps_id | u(3) |
|       } | |
|     } | |
|   } | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |
|     } | |
|   } | |
|   if( sps_scaling_list_enabled_flag ) { | |
|     ph_scaling_list_present_flag | u(1) |
|     if( ph_scaling_list_present_flag ) | |
|       ph_scaling_list_aps_id | u(3) |
|   } | |
|   if( sps_virtual_boundaries_enabled_flag && !sps_virtual_boundaries_present_flag ) { | |
|     ph_virtual_boundaries_present_flag | u(1) |
|     if( ph_virtual_boundaries_present_flag ) { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(13) |
|     } | |
|   } | |

TABLE 1-continued

| | Descriptor |
|---|---|
| if( output_flag_present_flag ) | |
|   pic_output_flag | u(1) |
| if( rpl_info_in_ph_flag ) | |
|   ref_pic_lists( ) | |
| if( partition_constraints_override_enabled_flag ) | |
|   partition_constraints_override_flag | u(1) |
| if( ph_intra_slice_allowed_flag ) { | |
|   if( partition_constraints_override_flag ) { | |
|     ph_log2_diff_min_qt_min_cb_intra_slice_luma | ue(v) |
|     ph_max_mtt_hierarchy_depth_intra_slice_luma | ue(v) |
|     if( ph_max_mtt_hierarchy_depth_intra_slice_luma != 0 ) { | |
|       ph_log2_diff_max_bt_min_qt_intra_slice_luma | ue(v) |
|       ph_log2_diff_max_tt_min_qt_intra_slice_luma | ue(v) |
|     } | |
|     if( qtbtt_dual_tree_intra_flag ) { | |
|       ph_log2_diff_min_qt_min_cb_intra_slice_chroma | ue(v) |
|       ph_max_mtt_hierarchy_depth_intra_slice_chroma | ue(v) |
|       if( ph_max_mtt_hierarchy_depth_intra_slice_chroma != 0 ) { | |
|         ph_log2_diff_max_bt_min_qt_intra_slice_chroma | ue(v) |
|         ph_log2_diff_max_tt_min_qt_intra_slice_chroma | ue(v) |
|       } | |
|     } | |
|   } | |
|   if( cu_qp_delta_enabled_flag ) | |
|     ph_cu_qp_delta_subdiv_intra_slice | ue(v) |
|   if( pps_cu_chroma_qp_offset_list_enabled_flag ) | |
|     ph_cu_chroma_qp_offset_subdiv_intra_slice | ue(v) |
| } | |
| if( ph_inter_slice_allowed_flag ) { | |
|   if( partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
|   if( cu_qp_delta_enabled_flag ) | |
|     ph_cu_qp_delta_subdiv_inter_slice | ue(v) |
|   if( pps_cu_chroma_qp_offset_list_enabled_flag ) | |
|     ph_cu_chroma_qp_offset_subdiv_inter_slice | ue(v) |
|   if( sps_temporal_mvp_enabled_flag ) { | |
|     ph_temporal_mvp_enabled_flag | u(1) |
|     if( ph_temporal_mvp_enabled_flag && rpl_info_in_ph_flag ) { | |
|       ph_collocated_from_l0_flag | u(1) |
|       if( ( ph_collocated_from_l0_flag && | |
|         num_ref_entries[ 0 ][ RplsIdx[ 0 ] ] > 1 ) \|\| | |
|         ( !ph_collocated_from_l0_flag && | |
|         num_ref_entries[ 1 ][ RplsIdx[ 1 ] ] > 1 ) ) | |
|         ph_collocated_ref_idx | ue(v) |
|     } | |
|   } | |
|   mvd_l1_zero_flag | u(1) |
|   if( sps_fpel_mmvd_enabled_flag ) | |
|     ph_fpel_mmvd_ enabled_flag | u(1) |
|   if( sps_bdof_pic_present_flag ) | |
|     ph_disable_bdof_flag | u(1) |
|   if( sps_dmvr_pic_present_flag ) | |
|     ph_disable_dmvr_flag | u(1) |
|   if( sps_prof_pic_present_flag ) | |
|     ph_disable_prof_flag | u(1) |
|   if( ( pps_weighted_pred_flag \|\| pps_weighted_bipred_flag ) && | |
| wp_info_in_ph_flag ) | |
|     pred_weight_table( ) | |
| } | |
| if( qp_delta_info_in_ph_flag ) | |
|   ph_qp_delta | se(v) |
| if( sps_joint_cbcr_enabled_flag ) | |
|   ph_joint_cbcr_sign_flag | u(1) |
| if( sps_sao_enabled_flag && sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( sps_dep_quant_enabled_flag ) | |
|   ph_dep_quant_enabled_flag | u(1) |
| if( sps_sign_data_hiding_enabled_flag && !ph_dep_quant_enabled_flag ) | |
|   pic_sign_data_hiding_enabled_flag | u(1) |

TABLE 1-continued

| | Descriptor |
|---|---|
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |
|       ph_cr_beta_offset_div2 | se(v) |
|       ph_cr_tc_offset_div2 | se(v) |
|     } | |
|   } | |
| } | |
| if( picture_header_extension_present_flag ) { | |
|   ph_extension_length | ue(v) |
|   for( i = 0; i < ph_extension_length; i++ ) | |
|     ph_extension_data_byte[ i ] | u(8) |
|   } | |
| } | |

Referring to Table 1, the picture header syntax may include syntax elements (for example, ph_pic_output_flags) related to a procedure for outputting/removing a decoded picture. In one example, a bitstream may include at least one picture together with ph_pic_output_flag, the value of which is 1, where the at least one picture may be included in the output layer.

Table 2 shows an example of video parameter set (VPS) syntax.

TABLE 2

| | Descriptor |
|---|---|
| video_parameter_set_rbsp( ) { | |
|   vps_video_parameter_set_id | u(4) |
|   vps_max_layers_minus1 | u(6) |
|   vps_max_sublayers_minus1 | u(3) |
|   if( vps_max_layers_minus1 > 0 && | |
|   vps_max_sublayers_minus1 > 0 ) | |
|     vps_all_layers_same_num_sublayers_flag | u(1) |
|   if( vps_max_layers_minus1 > 0 ) | |
|     vps_all_independent_layers_flag | u(1) |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) { | |
|         vps_max_tid_ref_present_flag[ i ] | u(1) |
|         for( j = 0; j < i; j++ ) { | |
|           vps_direct_ref_layer_flag[ i ][ j ] | u(1) |
|           if( vps_max_tid_ref_present_flag[ i ] && | |
|           vps_direct_ref_layer_flag[ i ][ j ] ) | |
|             vps_max_tid_il_ref_pics_plus1[ i ][ j ] | u(3) |
|         } | |
|       } | |
|     } | |
|   } | |
|   if( vps_max_layers_minus1 > 0 ) { | |
|     if( vps_all_independent_layers_flag ) | |
|       vps_each_layer_is_an_ols_flag | u(1) |
|     if( !vps_each_layer_is_an_ols_flag ) { | |
|       if( !vps_all_independent_layers_flag ) | |
|         vps_ols_mode_idc | u(2) |
|       if( vps_ols_mode_idc == 2 ) { | |
|         vps_num_output_layer_sets_minus1 | u(8) |
|         for( i = 1; i <= vps_num_output_layer_sets_minus1; i ++) | |
|           for( j = 0; j <= vps_max_layers_minus1; j++ ) | |
|             vps_ols_output_layer_flag[ i ][ j ] | u(1) |
|       } | |
|     } | |

TABLE 2-continued

| | Descriptor |
|---|---|
|   } | |
|   vps_num_ptls_minus1 | u(8) |
|   for( i = 0; i <= vps_num_ptls_minus1; i++ ) { | |
|     if( i > 0 ) | |
|       vps_pt_present_flag[ i ] | u(1) |
|     if( !vps_all_layers_same_num_sublayers_flag ) | |
|       vps_ptl_max_temporal_id[ i ] | u(3) |
|   } | |
|   while( !byte_aligned( ) ) | |
|     vps_ptl_alignment_zero_bit /* equal to 0 */ | f(1) |
|   for( i = 0; i <= vps_num_ptls_minus1; i++ ) | |
|     profile_tier_level( vps_pt_present_flag[ i ], | |
|     vps_ptl_max_temporal_id[ i ] ) | |
|   for( i = 0; i < TotalNumOlss; i++ ) | |
|     if( vps_num_ptls_minus1 > 0 && | |
|     vps_num_ptls_minus1 + 1 != TotalNumOlss ) | |
|       vps_ols_ptl_idx[ i ] | u(8) |
|   if( !vps_each_layer_is_an_ols_flag ) { | |
|     vps_num_dpb_params_minus1 | ue(v) |
|     if( vps_max_sublayers_minus1 > 0 ) | |
|       vps_sublayer_dpb_params_present_flag | u(1) |
|     for( i = 0; i < VpsNumDpbParams; i++ ) { | |
|       if( !vps_all_layers_same_num_sublayers_flag ) | |
|         vps_dpb_max_temporal_id[ i ] | u(3) |
|       dpb_parameters( vps_dpb_max_temporal_id[ i ], | |
|           vps_sublayer_dpb_params_present_flag ) | |
|     } | |
|     for( i = 0; i < NumMultiLayerOlss; i++ ) { | |
|       vps_ols_dpb_pic_width[ i ] | ue(v) |
|       vps_ols_dpb_pic_height[ i ] | ue(v) |
|       vps_ols_dpb_chroma_format[ i ] | u(2) |
|       vps_ols_dpb_bitdepth_minus8[ i ] | ue(v) |
|       if( VpsNumDpbParams > 1 && | |
|       vps_num_dpb_params != NumMultiLayerOlss ) | |
|         vps_ols_dpb_params_idx[ i ] | ue(v) |
|     } | |
|     vps_general_hrd_params_present_flag | u(1) |
|   } | |
|   if( vps_general_hrd_params_present_flag ) { | |
|     general_hrd_parameters( ) | |
|     if( vps_max_sublayers_minus1 > 0 ) | |
|       vps_sublayer_cpb_params_present_flag | u(1) |
|     vps_num_ols_hrd_params_minus1 | ue(v) |
|     for( i = 0; i <= vps_num_ols_hrd_params_minus1 ; i++ ) { | |
|       if( !vps_all_layers_same_num_sublayers_flag ) | |
|         hrd_max_tid[ i ] | u(3) |
|       firstSubLayer = | |
|       vps_sublayer_cpb_params_present_flag ? 0 : | |
|       vps_hrd_max_tid[ i ] | |

TABLE 2-continued

| | Descriptor |
|---|---|
| ols_hrd_parameters( firstSubLayer, | |
| vps_hrd_max_tid[ i ] ) | |
| } | |
| if( vps_num_ols_hrd_params_minus1 > 0 && | |
| vps_num_ols_hrd_params_minus1 + | |
| 1 != NumMultiLayerOlss ) | |
| for( i = 0; i < NumMultiLayerOlss; i++ ) | |
| vps_ols_hrd_idx[ i ] | ue(v) |
| } | |

TABLE 2-continued

| | Descriptor |
|---|---|
| vps_extension_flag | u(1) |
| if( vps_extension_flag ) | |
| while( more_rbsp_data( ) ) | |
| vps_extension_data_flag | u(1) |
| rbsp_trailing_bits( ) | |
| } | |

Table 3 shows an example of semantics on the video parameter set syntax.

TABLE 3

A VPS RBSP shall be available to the decoding process prior to it being referenced, included in at least one AU with TemporalId equal to 0 or provided through external means.
All VPS NAL units with a particular value of vps_video_parameter_set_id in a CVS shall have the same content.
vps_video_parameter_set_id provides an identifier for the VPS for reference by other syntax elements. The value of vps_video_parameter_set_id shall be greater than 0.
vps_max_layers_minus1 plus 1 specifies the maximum allowed number of layers in each CVS referring to the VPS.
vps_max_sublayers_minus1 plus 1 specifies the maximum number of temporal sublayers that may be present in a layer in each CVS referring to the VPS. The value of vps_max_sublayers_minus1 shall be in the range of 0 to 6, inclusive.
vps_all_layers_same_num_sublayers_flag equal to 1 specifies that the number of temporal sublayers is the same for all the layers in each CVS referring to the VPS. vps_all_layers_same_num_sublayers_flag equal to 0 specifies that the layers in each CVS referring to the VPS may or may not have the same number of temporal sublayers. When not present, the value of vps_all_layers_same_num_sublayers_flag is inferred to be equal to 1.
vps_all_independent_layers_flag equal to 1 specifies that all layers in the CVS are independently coded without using inter-layer prediction. vps_all_independent_layers_flag equal to 0 specifies that one or more of the layers in the CVS may use inter-layer prediction. When not present, the value of vps_all_independent_layers_flag is inferred to be equal to 1.
vps_layer_id[ i ] specifies the nuh_layer_id value of the i-th layer. For any two non-negative integer values of m and n, when m is less than n, the value of vps_layer_id[ m ] shall be less than vps_layer_id[ n ].
vps_independent_layer_flag[ i ] equal to 1 specifies that the layer with index i does not use inter-layer prediction. vps_independent_layer_flag[ i ] equal to 0 specifies that the layer with index i may use inter-layer prediction and the syntax elements vps_direct_ref_layer_flag[ i ][ j ] for j in the range of 0 to i − 1, inclusive, are present in VPS. When not present, the value of vps_independent_layer_flag[ i ] is inferred to be equal to 1.
vps_max_tid_ref_present_flag[ i ] equal to 1 specifies that the syntax element vps_max_tid_il_ref_pics_plus1[ i ][ j ] is present. vps_max_tid_ref_present_flag[ i ] equal to 0 specifies that the syntax element vps_max_tid_il_ref pics plus1[ i ][ j ] is not present.
vps_direct_ref_layer_flag[ i ][ j ] equal to 0 specifies that the layer with index j is not a direct reference layer for the layer with index i. vps_direct ref_layer flag [ i ][ j ] equal to 1 specifies that the layer with index j is a direct reference layer for the layer with index i. When vps_direct ref_layer flag[ i ][ j ] is not present for i and j in the range of 0 to vps_max layers_minus1, inclusive, it is inferred to be equal to 0. When vps_independent_layer_flag[ i ] is equal to 0, there shall be at least one value of j in the range of 0 to i − 1, inclusive, such that the value of vps_direct_ref_layer_flag[ i ][ j ] is equal to 1.
The variables NumDirectRefLayers[ i ], DirectRefLayerIdx[ i ][ d ], NumRefLayers[ i ], RefLayerIdx[ i ][ r ], and LayerUsedAsRefLayerFlag[ j ] are derived as follows:
```
    for( i = 0; i <= vps_max_layers_minus1; i++ ) {
        for( j = 0; j <= vps_max_layers_minus1; j++ ) {
            dependencyFlag[ i ][ j ] = vps_direct_ref_layer_flag[ i ][ j ]
            for(k = 0; k < i; k++ )
                if( vps_direct_ref_layer flag[ i ][ k ] && dependencyFlag[ k ][ j ] )
                    dependencyFlag[ i ][ j ] = 1
        }
        LayerUsedAsRefLayerFlag[ i ] = 0
    }
    for( i = 0; i <= vps_max_layers_minus1; i++ ) {
        for( j = 0, d = 0, r = 0; j <= vps_max_layers_minus1; j++ ) {
            if( vps_direct_ref_layer_flag[ i ][ i ] ) {
                DirectRefLayerIdx[ i ][ d++ ] = j
                LayerUsedAsRefLayerFlag[ j ] = 1
            }
            if( dependency Flag[ i ][ j ] )
                RefLayerIdx[ i ][ r++ ] = j
        }
        NumDirectRefLayers[ i ] = d
        NumRefLayers[ i ] = r
    }
```
The variable GeneralLayerIdx[ i ], specifying the layer index of the layer with nuh_layer_id equal to vps_layer_id[ i ], is derived as follows:
```
    for( i = 0; i <= vps_max_layers_minus1; i++ )
        GeneralLayerIdx[ vps_layer_id[ i ] ] = i
```
For any two different values of i and j, both in the range of 0 to vps_max_layers_minus1, inclusive, when dependencyFlag[ i ][ j ] equal to 1, it is a requirement of bitstream conformance that the values of TABLE 3-continued sps_chroma_format_idc and sps_bit_depth_minus8 that apply to the i-th layer shall be equal to the values of
sps_chroma_format_idc and sps_bit_depth_minus8, respectively, that apply to the j-th layer.
vps_max_tid_il_ref_pics_plus1[ i ][ j ] equal to 0 specifies that the pictures of the j-th layer that are neither
IRAP pictures nor GDR pictures with ph_recovery_poc_cnt equal to 0 are not used as ILRPs for decoding of
pictures of the i-th layer. vps_max_tid_il ref pics plus1[ i ][ j ] greater than 0 specifies that, for decoding
pictures of the i-th layer, no picture from the j-th layer with TemporalId greater than
vps_max_tid_il_ref_pics_plus1[ i ][ j ] − 1 is used as ILRP. When not present, the value of
vps_max_tid_il_ref_pics_plus1[ i ][ j ] is inferred to be equal to vps_max_sublayers_minus1 + 1.
vps_each_layer_is_an_ols_flag equal to 1 specifies that each OLS contains only one layer and each layer
itself in a CVS referring to the VPS is an OLS with the single included layer being the only output layer.
vps_each_layer_is_an_ols_flag equal to 0 that at least one OLS contains more than one layer. If
vps_max_layers_minus1 is equal to 0, the value of vps_each_layer_is_an_ols_flag is inferred to be equal to 1.
Otherwise, when vps_all_independent_layers_flag is equal to 0, the value of vps_each_layer_is_an_ols_flag is
inferred to be equal to 0.
vps_ols_mode_idc equal to 0 specifies that the total number of OLSs specified by the VPS is equal to
vps_max_layers_minus1 + 1, the i-th OLS includes the layers with layer indices from 0 to i, inclusive, and for
each OLS only the highest layer in the OLS is an output layer.
vps_ols_mode_idc equal to 1 specifies that the total number of OLSs specified by the VPS is equal to
vps_max_layers_minus1 + 1, the i-th OLS includes the layers with layer indices from 0 to i, inclusive, and for
each OLS all layers in the OLS are output layers.
vps_ols_mode_idc equal to 2 specifies that the total number of OLSs specified by the VPS is explicitly
signalled and for each OLS the output layers are explicitly signalled and other layers are the layers that are
direct or indirect reference layers of the output layers of the OLS.
The value of vps_ols_mode_idc shall be in the range of 0 to 2, inclusive. The value 3 of vps_ols_mode_idc is
reserved for future use by ITU-T | ISO/IEC.
When vps_all_independent_layers_flag is equal to 1 and vps_each_layer_is_an_ols_flag is equal to 0, the value
of vps_ols_mode_idc is inferred to be equal to 2.
vps_num_output_layer_sets_minus1 plus 1 specifies the total number of OLSs specified by the VPS when
vps_ols_mode_idc is equal to 2.
The variable TotalNumOlss, specifying the total number of OLSs specified by the VPS, is derived as follows:
   if( vps_max_layers_minus1 = = 0 )
     TotalNumOlss = 1
   else if( vps_each_layer_is_an_ols_flag | | vps_ols_mode_idc == 0 | | vps_ols_mode_idc = = 1 )
     TotalNumOlss = vps_max_layers_minus1 + 1
   else if( vps_ols_mode_idc = = 2)
     TotalNumOlss = vps_num_output_layer_sets_minus1 + 1
vps_ols_output_layer_flag[i ][ j ] equal to 1 specifies that the layer with nuh_layer_id equal to
vps_layer_id[ j] is an output layer of the i-th OLS when vps_ols_mode_idc is equal to 2.
vps_ols_output_layer_flag[ i ][ j ] equal to 0 specifies that the layer with nuh_layer_id equal to
vps_layer_id[ j ] is not an output layer of the i-th OLS when vps_ols_mode_idc is equal to 2.
The variable NumOutputLayersInOls[ i ], specifying the number of output layers in the i-th OLS, the variable
NumSubLayersInLayerInOLS[ i ][ j ], specifying the number of sublayers in the j-th layer in the i-th OLS, the
variable OutputLayerIdInOls[ i ][ j ], specifying the nuh_layer_id value of the j-th output layer in the i-th OLS,
and the variable LayerUsedAsOutputLayerFlag[ k ], specifying whether the k-th layer is used as an output layer
in at least one OLS, are derived as follows:
   NumOutputLayersInOls[ 0 ] = 1
   OutputLayerIdInOls[ 0 ][ 0 ] = vps_layer_id[ 0 ]
   NumSubLayersInLayerInOLS[ 0 ][ 0 ] = vps_max_sub_layers_minus1 + 1
   LayerUsedAsOutputLayerFlag[ 0 ] = 1
   for( i= 1, i <= vps_max_layers_minus1; i++ ) {
     if( vps_each_layer_is_an_ols_flag | | vps_ols_mode_idc < 2 )
       LayerUsedAsOutputLayerFlag[ i ] = 1
     else /*( !vps_each_layer_is_an_ols_flag && vps_ols_mode_idc == 2 )*/
       LayerUsedAsOutputLayerFlag[ i ] = 0
   }
   for( i = 1; i < TotalNumOlss; i++ )
     if( vps_each_layer_is_an_ols_flag | | vps_ols_mode_idc = = 0 ) {
       NumOutputLayersInOls[ i ] = 1
       OutputLayerIdInOls[ i ][ 0 ] = vps_layer_id[ i ]
       if( vps_each_layer_is_an_ols_flag)
         NumSubLayersInLayerInOLS[ i ][ 0 ] = vps_max_sub_layers_minus1 + 1
       else {
         NumSubLayersInLayerInOLS[ i ][ i ] = vps_max_sub_layers_minus1 + 1
         for( k = i − 1, k >= 0; k-- ) {
           NumSubLayersInLayerInOLS[ i ][ k ] = 0
           for( m = k + 1; m <= i; m++ ) {
             maxSublayerNeeded = min( NumSubLayersInLayerInOLS[ i ][ m ],
                vps_max_tid_il_ref_pics plus1 [ m ][ k ])
             if( vps_direct_ref_layer_flag[ m ][ k ] &&
                NumSubLayersInLayerInOLS[ i ][ k ] < maxSublayerNeeded )
               NumSubLayersInLayerInOLS[ i ][ k ] = maxSublayerNeeded
           }
         }
       }
     } else if( vps_ols_mode_idc = = 1 ) {
       NumOutputLayersInOls[ i ] = i + 1
       for( j = 0; j < NumOutputLayersInOls[ i ]; j++ ) {
         OutputLayerIdInOls[ i ][ j ] = vps_layer_id[ j ]
         NumSubLayersInLayerInOLS[ i ][ j ] = vps_max_sub_layers_minus1 + 1
       }

TABLE 3-continued

```
    } else if( vps_ols_mode_idc = = 2 ) {
        for(j = 0; j <= vps_max_layers_minus1; j++ ) {
            layerIncludedInOlsFlag[ i ][ j ] = 0
            NumSubLayersInLayerInOLS[ i ][ j ] =0
        }
        highestIncludedLayer = 0
        numLayerInOls = 0
        for( k = 0, j = 0; k <= vps max layers_minus1; k++ )
            if( vps_ols_output_layer_flag[ i ][ k ] ) {
                layerIncludedInOlsFlag[ i ][ k ] = 1
                highestIncludedLayer = k
                numLayerInOls++
                LayerUsedAsOutputLayerFlag[ k ] = 1
                OutputLayerIdx[ i ][ j ] = k
                OutputLayerIdInOls[ i ][ j++ ] = vps_layer_id[ k ]
                NumSubLayersInLayerInOLS[ i ][ k ] = vps_max_sub_layers_minus1 + 1
            }
        NumOutputLayersInOls[ i ] = j
        for( j = 0; j < NumOutputLayersInOls[ i ]; j++ ) {
            idx = OutputLayerIdx[ i ][ j ]
            for( k = 0; k < NumRefLayers[ idx ]; k++ ) {
                if (!layerIncludedInOlsFlag[ i ][ RefLayerIdx[ idx ][ k ] ] )
                    numLayerInOls++
                layerIncludedInOlsFlag[ i ][ RefLayerIdx[ idx ][ k ] ] = 1
            }
        }
        for( k = highestIncludedLayer – 1; k >= 0; k-- )
            if( layerIncludedInOlsFlag[ i ][ k ] && lvps_ols_output_layer_flag[ i ][ k ] )
                for( m = k + 1; m <= highestIncludedLayer, m++ ) {
                    maxSublayerNeeded = min( NumSubLayersInLayerInOLS[ i ][ m ],
                        vps_max_tid_il_ref_pics_plus1[ m ][k ] )
                    if( vps_direct_ref_layer_flag[ m ][ k ] && layerIncludedInOlsFlag[ i ][ m ] &&
                        NumSubLayersInLayerInOLS[ i ][ k ] < maxSublayerNeeded )
                        NumSubLayersInLayerInOLS[ i ][ k ] = maxSublayerNeeded
                }
    }
```

For each value of i in the range of 0 to vps_max_layers_minus1, inclusive, the values of
LayerUsedAsRefLayerFlag[ i ] and LayerUsedAsOutputLayerFlag[ i ] shall not be both equal to 0. In other
words, there shall be no layer that is neither an output layer of at least one OLS nor a direct reference layer of
any other layer.
For each OLS, there shall be at least one layer that is an output layer. In other words, for any value of i in the
range of 0 to TotalNumOlss – 1, inclusive, the value of NumOutputLayersInOls[ i ] shall be greater than or
equal to 1.
The variable NumLayersInOls[ i ], specifying the number of layers in the i-th OLS, the variable
LayerIdInOls[ i ][ j ], specifying the nuh layer_id value of the j-th layer in the i-th OLS, the variable
   NumMultiLayerOlss, specifying the number of multi-layer OLSs (i.e., OLSs that contain more than one layer),
and the variable MultiLayerOlsIdx[ i ], specifying the index to the list of multi-layer OLSs for the i-th OLS
when NumLayersInOls[ i ] is greater than 0, are derived as follows:

```
        NumLayersInOls[ 0 ] = 1
        LayerIdInOls[ 0 ][ 0 ] = vps_layer_id[ 0 ]
        NumMultiLayerOlss = 0
        for( i = 1; i < TotalNumOlss; i++ ) {
            if( vps_each_layer_is_an ols_flag ) {
                NumLayersInOls[ i ] = 1
                LayerIdInOls[ i ][ 0 ] = vps_layer_id[ i ]
            } else if( vps_ols_mode_idc == 0 | | vps_ols_mode_idc == 1 ) {
                NumLayersInOls[ i ] = i + ]
                for( j = 0; j < NumLayersInOls[ i ]; j++ )
                    LayerIdInOls[ i ][ j ] = vps_layer_id[ j ]
            } else if( vps_ols_mode_idc = = 2 ) {
                for( k = 0, j = 0; k <= vps_max_layers_minus1; k++ )
                    if( layerIncludedInOlsFlag[ i ][ k ] )
                        LayerIdInOls[ i ][ j++ ] = vps_layer_id[ k ]
                NumLayersInOls[ i ] = j
            }
            if( NumLayersInOls[ i ] > 1 ) {
                MultiLayerOlsIdx[ i ] = NumMultiLayerOlss
                NumMultiLayerOlss++
            }
        }
```

NOTE 1 - The 0-th OLS contains only the lowest layer (i.e., the layer with nuh_layer_id equal to vps_layer_id[
0 ])
   and for the 0-th OLS the only included layer is output.
The variable OlsLayerIdx[ i ][ j ], specifying the OLS layer index of the layer with nuh_layer_id equal to
LayerIdInOls[ i ][ j ], is derived as follows:

```
        for( i = 0; i < TotalNumOlss; i++ )
            for j = 0; j < NumLayersInOls[ i ]; j++ )
                OlsLayerIdx[ i ][ LayerIdInOls[ i ][ j ] ] = j
```

The lowest layer in each OLS shall be an independent layer. In other words, for each i in the range of 0 to
TotalNumOlss – 1, inclusive, the value of TABLE 3-continued vps_independent_layer_flag[ GeneralLayerIdx[ LayerIdInOls[ i ][ 0 ] ] ] shall be equal to 1.
Each layer shall be included in at least one OLS specified by the VPS. In other words, for each layer with a
particular value of nuh_layer_id nuhLayerId equal to one of vps_layer_id[ k ] for k in the range of 0 to
vps_max_layers_minus1, inclusive, there shall be at least one pair of values of i and j, where i is in the range
of 0 to TotalNumOlss − 1, inclusive, and j is in the range of NumLayersInOls[ i ] − 1, inclusive, such that the
value of LayerIdInOls[ i ][ j ] is equal to nuhLayerId.
vps_num_ptls_minus1 plus 1 specifies the number of profile_tier_level( ) syntax structures in the VPS. The
value of vps_num_ptls_minus1 shall be less than TotalNumOlss.
vps_pt_present_flag[ i ] equal to 1 specifies that profile, tier, and general constraints information are present
in the i-th profile_tier_level( ) syntax structure in the VPS. vps_pt_present_flag[ i ] equal to 0 specifies that
profile, tier, and general constraints information are not present in the i-th profile_tier_level( ) syntax structure
in the VPS. The value of vps_pt_present_flag[ 0 ] is inferred to be equal to 1. When vps_pt_present_flag[ i ] is
equal to 0, the profile, tier, and general constraints information for the i-th profile_tier_level( ) syntax structure
in the VPS are inferred to be the same as that for the ( i − 1 )-th profile_tier_level( ) syntax structure in the
VPS.
vps_ptl_max_temporal_id[ i ] specifies the TemporalId of the highest sublayer representation for which the
level information is present in the i-th profile_tier_level( ) syntax structure in the VPS. The value of
vps_ptl_max_temporal_id[ i ] shall be in the range of 0 to vps_max_sublayers_minus1, inclusive. When not
present, the value of vps_ptl_max_temporal_id[ i ] is inferred to be equal to vps_max_sublayers_minus1.
vps_ptl_alignment_zero_bit shall be equal to 0.
vps_ols_ptl_idx[ i ] specifies the index, to the list of profile_tier_level( ) syntax structures in the VPS, of the
profile_tier_level( ) syntax structure that applies to the i-th OLS. When present, the value of
vps_ols_ptl_idx[ i ] shall be in the range of 0 to vps_num_ptls_minus1, inclusive.
When not present, the value of vps_ols_ptl_idx[ i ] is inferred as follows:
- If vps_num_ptls_minus1 is equal to 0, the value of vps_ols_ptl_idx[ i ] is inferred to be equal to 0.
- Otherwise (vps_num_ptls_minus1 is greater than 0 and vps_num pils_minus1 + 1 is equal to
  TotalNumOlss), the value of vps_ols_ptl_idx[ i ] is inferred to be equal to i.
When NumLayersInOls[ i ] is equal to 1, the profile_tier_level( ) syntax structure that applies to the i-th OLS
is also present in the SPS referred to by the layer in the i-th OLS. It is a requirement of bitstream conformance
that, when NumLayersInOls[ i ] is equal to 1, the profile_tier_level( ) syntax structures signalled in the VPS
and in the SPS for the i-th OLS shall be identical.
Each profile_tier_level( ) syntax structure in the VPS shall be referred to by at least one value of
vps_ols_ptl_idx[ i ] for i in the range of 0 to TotalNumOlss − 1, inclusive.
vps_num_dpb_params_minus1 plus 1, when present, specifies the number of dpb_parameters( ) syntax
strutcures in the VPS. The value of vps_num_dpb_params_minus1 shall be in the range of 0 to
NumMultiLayerOlss − 1, inclusive.
The variable VpsNumDpbParams, specifying the number of dpb_parameters( ) syntax strutcures in the VPS,
is derived as follows:
    if( vps_each_layer_is_an_ols_flag )
      VpsNumDpbParams = 0
    else
      VpsNumDpbParams = vps_num_dpb_params_minus1 + 1
vps_sublayer_dpb_params_present_flag is used to control the presence of
max_dec_pic_buffering_minus1[ ], max_num reorder pics[ ], and max latency_increase_plus1[ ] syntax
elements in the dpb_parameters( ) syntax strucures in the VPS. When not present,
vps_sub_dpb_params_info present_flag is inferred to be equal to 0.
vps_dpb_max_temporal_id[ i ] specifies the TemporalId of the highest sublayer representation for which the
DPB parameters may be present in the i-th dpb_parameters( ) syntax strutcure in the VPS. The value of
vps_dpb_max_temporal_id[ i ] shall be in the range of 0 to vps_max_sublayers_minus1, inclusive. When not
present, the value of vps_dpb_max_temporal_id[ i ] is inferred to be equal to vps max_sublayers_minus1.
vps_ols_dpb_pic_width[ i ] specifies the width, in units of luma samples, of each picture storage buffer for
the i-th multi-laver OLS.
vps_ols_dpb_pic_height[ i ] specifies the height, in units of luma samples, of each picture storage buffer for
the i-th multi-layer OLS.
vps_ols_dpb_chroma_format[ i ] specifies the greatest allowed value of sps_chroma_format_idc for all SPSs
that are referred to by CLVSs in the CVS for the i-th multi-layer OLS.
vps_ols_dpb_bitdepth_minus8[ i ] specifies the greatest allowed value of sps_bit_depth minus8 for all SPSs
that are referred to by CLVSs in the CVS for the i-th multi-layer OLS.
    NOTE 2 - For decoding the i-th multi-layer OLS, the deoder can safely allocate memory for the DPB according
to the
    values of the syntax elements vps_ols_dpb_pic_width[ i ], vps_ols_dpb_pic_height[ i ],
    vps_ols_dpb_chroma_format[ i ],
    and vps_ols_dpb_bitdepth_minus8[ i ].
vps_ols_dpb_params_idx[ i ] specifies the index, to the list of dpb_parameters( ) syntax structures in the VPS,
of the dpb_parameters( ) syntax structure that applies to the i-th multi-layer OLS. When present, the value of
vps_ols_dpb_params_idx[ i ] shall be in the range of 0 to VpsNumDpbParams − 1, inclusive.
When vps_ols_dpb_params_idx[ i ] is not present, it is inferred as follows:
- If VpsNumDpbParams is equal to 1, the value of vps_ols_dpb_params_idx[ i ] to be equal to 0.
- Otherwise (VpsNumDpbParams is greater than 1 and equal to NumMultiLayerOlss), the value of
  vps_ols_dpb_params_idx[ i ] is inferred to be equal to i.
For a single-layer OLS, the applicable dpb_parameters( ) syntax structure is present in the SPS referred to by
the layer in the OLS.
Each dpb_parameters( ) syntax structure in the VPS shall be referred to by at least one value of
vps_ols_dpb_params_idx[ i ] for i in the range of 0 to NumMultiLayerOlss − 1, inclusive.
vps_general_hrd_params_present_flag equal to 1 specifies that the VPS contains a
general_hrd_parameters( ) syntax structure and other HRD parameters. vps_general_hrd_params_present_flag
equal to 0 specifies that the VPS does not contain a general_hrd_parameters( ) syntax structure or other HRD
parameters. When not present, the value of vps_general_hrd_params_present_flag is inferred to be equal to 0.
When NumLayersInOls[ i ] is equal to 1, the general_hrd_parameters( ) syntax structure and the
ols_hrd_parameters( ) syntax structure that apply to the i-th OLS are present in the SPS referred to by the layer TABLE 3-continued in the i-th OLS.
vps_sublayer_cpb_params_present_flag equal to 1 specifies that the i-th ols_hrd_parameters( ) syntax
structure in the VPS contains HRD parameters for the sublayer representations with TemporalId in the range
of 0 to vps_hrd_max_tid[ i ], inclusive. vps_sublayer_cpb_params_present_flag equal to 0 specifies that the i-
th ols_hrd_parameters( ) syntax structure in the VPS contains HRD parameters for the sublayer representation
with TemporalId equal to vps_hrd_max_tid[ i ] only. When vps_max_sublayers_minus1 is equal to 0, the value
of vps_sublayer_cpb_params_present_flag is inferred to be equal to 0.
When vps_sublayer_cpb_params_present_flag is equal to 0, the HRD parameters for the sublayer
representations with TemporalId in the range of 0 to vps_hrd_max_tid[ i ] − 1, inclusive, are inferred to be the
same as that for the sublayer representation with TemporalId equal to vps_hrd_max_tid[ i ]. These include the
HRD parameters starting from the fixed_pic_rate_general_flag[ i ] syntax element till the
sublayer_hrd_parameters( i ) syntax structure immediately under the condition
"if( general_vcl_hrd_params_present_flag )" in the ols_hrd_parameters syntax structure.
vps_num_ols_hrd_params_minus1 plus 1 specifies the number of ols_hrd_parameters( ) syntax structures
present in the VPS when vps_general_hrd_params_present_flag is equal to 1. The value of
vps_num_ols_hrd_params_minus1 shall be in the range of 0) to NumMultiLayerOlss − 1, inclusive.
vps_hrd_max_tid[ i ] specifies the TemporalId of the highest sublayer representation for which the HRD
parameters are contained in the i-th ols_hrd_parameters( ) syntax structure. The value of vps_hrd_max_tid[ i ]
shall be in the range of 0 to vps_max_sublayers_minus1, inclusive. When not present, the value of
vps_hrd_max_tid[ i ] is inferred to be equal to vps_max_sublayers_minus1.
vps_ols_hrd_idx[ i ] specifies the index, to the list of ols_hrd_parameters( ) syntax structures in the VPS, of
the ols_hrd_parameters( ) syntax structure that applies to the i-th multi-layer OLS. The value of
vps_ols_hrd_idx[ i ] shall be in the range of 0 to vps_num_ols_hrd params_minus1, inclusive.
When vps_ols_hrd_idx[ i ] is not present, it is inferred as follows:
-    If vps_num_ols_hrd_params_minus1 is equal to 0, the value of vps_ols_hrd_idx[[ i ] is inferred to be
     equal to 0.
-    Otherwise (vps_num_ols_hrd_params_minus1 + 1 is greater than 1 and equal to NumMultiLayerOlss),
     the value of vps_ols_hrd_idx[ i ] is inferred to be equal to i.
For a single-layer OLS, the applicable ols_hrd_parameters( ) syntax structure is present in the SPS referred to
by the layer in the OLS.
Each ols_hrd_parameters( ) syntax structure in the VPS shall be referred to by at least one value of
vps_ols hrd_idx[ i ] for i in the range of 1 to NumMultiLayerOlss − 1, inclusive.
vps_extension_flag equal to 0 specifies that no vps_extension_data_flag syntax elements are present in the
VPS RBSP syntax structure. vps_extension_flag equal to 1 specifies that there are vps_extension_data_flag
syntax elements present in the VPS RBSP syntax structure.
vps_extension_data_flag may have any value. Its presence and value do not affect decoder conformance to
profiles specified in this version of this Specification. Decoders conforming to this version of this Specification
shall ignore all vps_extension_data_flag syntax elements.

Referring to Table 2 and/or Table 3, output layer set (OLS) may be derived based on VPS. Here, OLS may be a set of layers related to one or more layers specified as output layers. The VPS may be included in the image information obtained from a bitstream. The OLS may be derived based on the multilayer-related information (for example, information on the OLSs) within the VPS. The index for a list of the layers within the OLS may be called OLS index. In other words, the OLS index may be an index of a layer within the OLS.

In one example, the total number of OLSs may be specified based on at least one syntax element (for example, vps_max_layers_minus1, vps_each_layer_is_an_ols_flag, vps_ols_mode_idc and/or vps_num_output_layer_sets_minus1) within a VPS. The maximum number of layers allowed within each CVS may be specified based on the syntax element (for example, vps_max_layers_minus1) within the VPS. The layer ID of the i-th layers may be specified based on the syntax element (for example, vps_layer_id[i]) within the VPS. The OLS may be derived based on the syntax element (for example, vps_ols_output_layer_flag[i][j]) within the VPS, and output layers included in the OLS may be derived. For example, a layer having a layer ID of vps_layer_id[i] may be derived as an output layer of the j-th OLS based on vps_ols_output_layer_flag[i][j]. A decoded CVS may not include a layer not included in a layer within a target OLS. In one example, the number of layers specified by the VPS may be derived based on the syntax element (for example, vps_max_layers_minus1) within the VPS, where the number of layers may mean the maximum number of layers allowed within each CVS that refers to the VPS.

Referring to Table 2 and/or 3, sublayer(s) may be derived based on a VPS. A sublayer may refer to a temporal scalable layer of a temporal scalable bitstream. A sublayer may be composed of NAL units having a specific value of TemporalId. In one example, the maximum number of temporal sublayers existing within a layer specified by the VPS may be derived based on the syntax element (for example, vps_max_sublayers_minus1) within the VPS.

Table 4 shows an example of access unit delimiter (AUD) syntax.

TABLE 4

|  | Descriptor |
| --- | --- |
| access_unit_delimiter_rbsp( ) { | |
| aud_irap_or_gdr_au_flag | u(1) |
| aud_pic_type | u(3) |
| rbsp_trailing_bits( ) | |
| } | |

Table 5 shows an example of semantics on the AUD syntax.

TABLE 5

The AU delimiter is used to indicate the start of an AU,
whether the AU is an IRAP or GDR AU, and the type of slices
present in the coded pictures in the AU containing the AU
delimiter NAL unit. When the bitstream contains only one
layer, there is no normative decoding process associated with
the AU delimiter. aud_irap_or_gdr_au_flag equal to 1 specifies
that the AU containing the AU delimiter is an IRAP or GDR AU
aud_irap_or_gdr_au_flag equal to 0 specifies that the AU TABLE 5-continued containing the AU delimiter is not an IRAP or GDR AU.
aud_pic_type indicates that the sh_slice_type values for all
slices of the coded pictures in the AU containing the AU
delimiter NAL unit are members of the set listed in Table 7
for the given value of aud_pic_type. The value
aud_pic_type shall be equal to 0, 1 or 2 in bitstreams conforming
to this version of this Specification. Other values of
aud_pic_type are reserved for future use by ITU-T | ISO/IEC.
Decoders conforming to this version of this Specification
shall ignore reserved values of aud_pic_type.

Table 7 - Interpretation of aud_pic_type

| aud_pic_type | sh_slice_type values that may be present in the AU |
| --- | --- |
| 0 | I |
| 1 | P, I |
| 2 | B, P, I |

Table 6 shows another example of the AUD syntax.

TABLE 6

|  | Descriptor |
| --- | --- |
| access_unit_delimiter_rbsp( ) { |  |
|     aud_irap_or_gdr_au_flag | u(1) |
|     aud_pic_type | u(3) |
|     if( aud_irap_or_gdr_au_flag ) { |  |
|         aud_htid_info_present_flag | u(1) |
|         aud_ols_info_present_flag | u(1) |
|         if( aud_htid_info_present_flag ) |  |
|             aud_cvs_htid_plus1 | u(3) |
|         if( aud_ols_info_present_flag ) |  |
|             aud_cvs_ols_idx | ue(v) |
|     } |  |
|     rbsp_trailing_bits( ) |  |
| } |  |

Table 7 shows another example of semantics on the AUD syntax.

TABLE 7

...
aud_htid_info_present_flag equal to 0 specifies that
aud_cvs_htid_plus1 is not present in the AUD NAL unit.
aud_htid_info_present_flag equal to 1 specifies that
aud_cvs_htid_plus1 is present in the AUD NAL unit.
aud_ols_info_present_flag equal to 0 specifies that
aud_cvs_ols_idx is not present in the AUD NAL unit.
aud_ols_info_present_flag equal to 1 specifies that
aud_cvs_ols_idx is present in the AUD NAL unit.
aud_cvs_htid_plus1 equal to 0 specifies that all the pictures
in the CVS starting with the AUD NAL unit are IRAP pictures or GDR
pictures with ph_recovery_poc_cnt equal to 0. aud_cvs_htid_plus1
greater than 0 specifies that all the pictures in the CVS starting
with the AUD NAL unit have TemporalId less than aud_cvs_htid_plus1.
aud_cvs_ols_idx specifies that the CVS starting with the AUD NAL
unit does not contain any other layers than those included in the
OLS with OLS index equal to aud_cvs_ols_idx.
...

Table 8 shows an example of general constraint information syntax.

TABLE 8

|  | Descriptor |
| --- | --- |
| general_constraint_info( ) { |  |
|     [...] | u(1) |
|     general_single_ols_per_layer_set_constraint_flag | u(1) |
|     [...] | u(1) |

TABLE 8-continued

|  | Descriptor |
| --- | --- |
|     while( !byte_aligned( ) ) |  |
|         gci_alignment_zero_bit | f(1) |
|     gci_num_reserved_bytes | u(8) |
|     for( i = 0; i < gci_num_reserved_bytes; i++ ) |  |
|         gci_reserved_byte[ i ] | u(8) |
| } |  |

Table 9 shows an example of semantics on the general constraint information syntax.

TABLE 9 general_single_ols_per_layer_set_constraint_flag equal 1 specifies
that no two OLSs as defined in the VPS contain the same set of
layers. general_single_ols_per_layer_set_constraint_flag equal 0
specifies that two OLSs as defined in the VPS may or may not
contain the same set of layers.

In the existing method of determining a target OLS index and the highest temporal ID for a decoding process, the constraint that there has to be one AUD for each IRAP and GDR AUD is excessively strict. It is so because the AUD is not required when the IRAP or GDR AU is the first AU of a bitstream to be decoded.

The existing method of determining a target OLS index and the highest temporal ID for a decoding process may operate only for a multilayer bitstream. The present disclosure may provide a method of determining a bitstream including only a single layer may also be provided.

The existing method of determining a target OLS index and the highest temporal ID for a decoding process may be too restrictive since the method is used when a signaled target OLS index and the highest temporal ID exist and forces to use an externally designated value (external means) as a second selection. The present disclosure may provide an embodiment to solve the problem in the existing method.

In the existing method of determining a target OLS index and the highest temporal ID for a decoding process, the determination method based on an external means may follow SEI signaling.

According to one embodiment of the present disclosure, information on the target OLS index and information on the highest temporal identifier may be signaled in a specific NAL unit. The specific NAL unit may be referred to as a decoder parameters (DP) NAL unit or an operating point information (OPI) NAL unit. In other words, a specific NAL unit described below may be replaced with a DP NAL unit or an OPI NAL unit.

According to one embodiment of the present disclosure, the temporal identifier (ID) of the specific NAL unit may be 0. In one example, the layer identifier (ID) of the specific NAL unit may be lower than or equal to the ID of the lowest layer existing in a CVS or a bitstream (or a sub-bitstream). In another example, the layer ID of the specific NAL unit may be the same as the ID of the lowest layer existing in the CVS or the bitstream (or sub-bitstream). In another example, the layer ID of the specific NAL unit may be one of the layer IDs of the layers existing in the CVS or the bitstream (or sub-bitstream). In other words, the layer ID of the specific NAL unit may be the same as the layer ID of one of the layers existing in the CVS or the bitstream (or sub-bitstream). In another example, the layer ID of the specific NAL unit may be equal to 0. In another example, the layer ID of the specific NAL unit may not be limited and may assume any value of a valid layer ID.

According to one embodiment of the present document, the specific NAL unit may be a first NAL unit of an access unit (AU) unless there is an access unit identifier (access unit delimiter, AUD) for the access unit. In other words, the AUD may be the first NAL unit followed by the specific NAL unit. That is, the specific unit may be the first NAL unit following the AUD NAL unit within the AU.

According to one embodiment of the present disclosure, the specific NAL unit may not exist for each intra random access point access unit (IRAP AU) or gradual decoding refresh access unit (GDR AU). In another example, the specific NAL unit may exist within (belong to) an IRAP AU or a GDR AU.

According to one embodiment of the present disclosure, the specific NAL unit may not be required but may exist in an AU including at least one IRAP picture or GDR picture.

According to one embodiment of the present disclosure, the specific NAL unit may not be required but may exist in an AU including at least one IRAP slice or GDR slice.

According to one embodiment of the present disclosure, for sub-bitstream extraction, the bitstream extractor may update the target OLS index and/or the highest temporal ID in the specific NAL unit of an IRAP AU or a GDR AU of an output bitstream in the same way as the inputs of the sub-bitstream extraction procedure (for example, targetOlsIdx and/or tIdTarget). In another example, the bitstream extractor may remove the specific NAL unit including information on the target OLS index and/or information on the highest temporal identifier. In other words, the sub-bitstream extraction procedure may include a step of removing the specific NAL unit including information on the target OLS index and information on the highest temporal identifier.

According to one embodiment of the present disclosure, for sub-bitstream extraction, the bitstream extractor may add the specific NAL unit to an IRAP AU and/or a GDR AU that does not include the specific NAL unit, and the target OLS index and/or the highest temporal ID within the specific NAL unit may be the same as the inputs of the sub-bitstream extraction process (e.g., targetOlsIdx and tIdTarget).

According to one embodiment of the present disclosure, in the existence of the specific NAL unit, the specific NAL unit may include information on both the target layer ID and the highest temporal ID. In one example, it is not intended for the present disclosure that information on the target OLS index and the highest temporal ID is provided from different sources (e.g., the target OLS index from the specific NAL unit and the highest temporal ID from an external means).

According to one embodiment of the present disclosure, a flag for designating whether a target OLS index exists may be defined. For example, when a CVS/bitstream includes two or more layers, the flag should not be equal to 0, which means that the target OLS index has to be present in the specific NAL unit. In one example, the flag may be equal to 0 or 1 if the CVS/bitstream includes only one layer.

According to one embodiment of the present disclosure, in the existence of a VPS (in other words, when the value of sps_video_parameter_set_id is greater than 0), the value of the target OLS index signaled to the specific NAL unit has to be accurate. In other words, the target OLS index signaled to the specific NAL unit should be an OLS index included in a VPS including only the layers present in a CVS/bitstream. For example, suppose the specific NAL unit may exist in an access unit including at least one IRAP/GDR slice (or picture). In that case, the above constraint applies only to the specific NAL unit of an IRAP/GDR access unit.

According to one embodiment of the present disclosure, in the absence of the VPS (in other words, when the value of sps_video_parameter_set_id is 0), the target OLS index value of the specific NAL unit may be ignored.

According to one embodiment of the present disclosure, in the existence of a target OLS index in the specific NAL unit, the value of TargetOlsIdx may be set to be the same as the target OLS index signaled based on the specific NAL unit only when there is no externally designated value (a value determined by an external means). In other words, for deriving the target OLS index, an external means may be used preferentially over information on the target OLS index. A value provided by an external means may have a higher priority than a value provided by the specific NAL unit.

The embodiments based on the following tables may include the embodiments according to the present disclosure.

The following tables describe a syntax table based on a specific NAL unit and semantics related to the syntax table according to one embodiment of the present disclosure. In the table below, a syntax element dp_htid_plus1 may be referred to as the information on the highest temporal (sublayer) identifier, and dp_ols_idx may be referred to as the information on the target OLS index.

TABLE 10

|  | Descriptor |
|---|---|
| decoding_parameters_rbsp( ) { |  |
| dp_htid_plus1 | u(3) |
| dp_ols_idx | ue(v) |
| dp_extension_flag | u(1) |
| if( dp_extension_flag ) |  |
| while( more_rbsp_data( ) ) |  |
| dp_extension_data_flag | u(1) |
| rbsp_trailing_bits( ) |  |
| } |  |

TABLE 11 dp_htid_plus1 equal to 0 specifies that all the pictures in the CVS are IRAP pictures or GDR pictures with ph_recovery_poc_cnt equal to 0. dp_htid_plus1 greater than 0 specifies that all the pictures in the CVS have TemporalId less than dp_htid_plus1.
The variable DpHtid is set equal to ( ( dp_htid_plus1 > 0 ) ? dp_htid_plus1 − 1 : 0 ).
dp_ols_idx specifies that the CVS does not contain any other layers than those included in the OLS with OLS index equal to dp_ols_idx. The variable DpTargetOlsIdx is set equal to dp_ols_idx.
dp_extension_flag equal to 0 specifies that no dp_extension_data_flag syntax elements are present in the DP RBSP syntax structure. dp_extension_flag equal to 1 specifies that there may be dp_extension_data_flag syntax elements present in the DP RBSP syntax structure.
dp_extension_data_flag may have any value. Its presence and value do not affect decoder conformance to profiles specified in Annex A. Decoders conforming to this version of this Specification shall ignore all dp_extension_data_flag syntax elements.
...
The value of TemporalId for non-VCL NAL units is constrained as follows:
...
- Otherwise, if nal_unit_type is equal to DP_NUT, TemporalId shall be equal to 0.
...
When nal_unit_type is equal to DP_NUT, nuh_layer_id shall be equal to or lower than the nuh_layer_id of associated VCL NAL unit.
...
There can be at most one DP NAL unit in an IRAP AU or GDR AU. When DP NAL unit is present in an AU, it shall be the first NAL unit of the AU, unless AUD NAL unit is also present in the same AU

TABLE 11-continued (i.e., when both AUD NAL unit and DP NAL unit are present in the same AU, AUD NAL unit shall precede DP NAL unit in decoding order).
...
sps_video_parameter_set_id, when greater than 0, specifies the value of vps_video_parameter_set_id for the VPS referred to by the SPS.
When sps_video_parameter_set_id is equal to 0, the following applies:
- The SPS does not refer to a VPS, and no VPS is referred to when decoding each CLVS referring to the SPS.
- The value of vps_max_layers_minus1 is inferred to be equal to 0.
- The CVS shall contain only one layer (i.e., all VCL NAL unit in the CVS shall have the same value of nuh_layer_id).
- The value of GeneralLayerIdx[ nuh_layer_id ] is set equal to 0.
- The value of vps_independent_layer_flag[ GeneralLayerIdx[ nuh_layer_id ] ] is inferred to be equal to 1.
- The value of TotalNumOlss is set equal to 1, the value of NumLayersInOls[ 0 ] is set equal to 1, and value of vps_layer_id[ 0 ] is inferred to be equal to the value of nuh_layer_id of all the VCL NAL units, and the value of LayerIdInOls[ 0 ][ 0 ] is set equal to vps_layer_id[ 0 ].
   NOTE 2 - When sps_video_parameter_set_id is equal to 0, there is only one layer and only OLS "specified by the VPS".
When vps_independent_layer_flag[ GeneralLayerIdx[ nuh_layer_id ] ] is equal to 1, the SPS referred to by a CLVS with a particular nuh_layer_id value nuhLayerId shall have nuh_layer_id equal to nuhLayerId.
The value of sps_video_parameter_set_id shall be the same in all SPSs that are referred to by CLVSs in a CVS.
When sps_video_parameter_set_id is greater than 0 and DP NAL unit is present, the following applies:
- The value of dp_ols_idx shall range from 0 to TotalNumOlss.
- The OLS referred to by dp_ols_idx shall contain only the layers that are present in the CVS.
When sps_video_parameter_set_id is equal to 0 and DP NAL unit is present, the value of dp_ols_idx may be ignored.
...

The table below provides descriptions related to setting the highest temporal (sublayer) identifier in a decoding process.

TABLE 12

- The variable Htid, which identifies the highest temporal sublayer to be decoded, is specified as follows:
   - If there is external means not specified in this Specification to set the value of Htid, Htid is set to the value provided by the external means.
   - Otherwise if DP NAL unit, Htid is set equal to DpHtid.
- The variable TargetOlsIdx, which identifies the OLS index of the target OLS to be decoded, is specified as follows:
   - If there is external means not specified in this Specification to set the value of TargetOlsIdx, TargetOlsIdx is set to the value provided by the external means.
   - Otherwise if DP NAL unit is present, TargetOlsIdx is set equal to DpTargetOlsIdx.
- The CVS does not contain any other layers than those included in the target OLS and does not include any NAL unit with TemporalId greater than Htid.

The table below provides descriptions related to the specific NAL unit within the sub-bitstream extraction procedure and setting the target OLS index/highest temporal identifier.

TABLE 13

- For each IRAP or GDR AU, if DP NAL unit is present, set the syntax element values in the DP NAL unit as follows:
   - dp_htid_plus1 is set equal to tIdTarget + 1.
   - dp_ols_idx is set equal to targetOlsIdx.
- Otherwise, if DP NAL unit is not present for IRAP or GDR AU, a new DP NAL unit may be added and the value of syntax elements in the DP NAL unit are set as follows:
   - dp_htid_plus1 is set equal to tIdTarget + 1.
   - dp_ols_idx is set equal to targetOlsIdx.

The following tables describe a syntax table based on a specific NAL unit and semantics related to the syntax table according to one embodiment of the present disclosure. In the table below, a syntax element dp_htid_plus1 may be referred to as the information on the highest temporal (sublayer) identifier, and dp_ols_idx may be referred to as the information on the target OLS index.

TABLE 14

|  | Descriptor |
|---|---|
| decoding_parameters_rbsp( ) { |  |
|   dp_htid_plus1 | u(3) |
|   dp_ols_info_present_flag | u(1) |
|   if( dp_ols_info_present_flag ) |  |
|     dp_ols_idx | ue(v) |
|   dp_extension_flag | u(1) |
|   if( dp_extension_flag ) |  |
|     while( more_rbsp_data( ) ) |  |
|       dp_extension_data_flag | u(1) |
|   rbsp_trailing_bits( ) |  |
| } |  |

TABLE 15 dp_htid_plus1 equal to 0 specifies that all the pictures in the CVS are IRAP pictures or GDR pictures with ph_recovery_poc_cnt equal to 0. dp_htid_plus1 greater than 0 specifies that all the pictures in the CVS have TemporalId less than dp_htid_plus1.
The variable DpHtid is set equal to ( ( dp_htid_plus1 > 0 ) ? dp_htid_plus1 − 1 : 0 ).
dp_ols_info_present_flag equal to 0 specifies that dp_ols_idx is not present in the DP NAL unit. dp_ols_info_present_flag equal to 1 specifies that dp_ols_idx is present in the DP NAL unit.
When the CVS that contains the DP NAL unit has more than one layers, the value of dp_ols_info_present_flag shall be equal to 1.
dp_ols_idx specifies that the CVS does not contain any other layers than those included in the OLS with OLS index equal to dp_ols_idx.
The variable DpTargetOlsIdx is set equal to dp_ols_idx.
dp_extension_flag equal to 0 specifies that no dp_extension_data_flag syntax elements are present in the DP RBSP syntax structure. dp_extension_flag equal to 1 specifies that there may be dp_extension_data_flag syntax elements present in the DP RBSP syntax structure.
dp_extension_data_flag may have any value. Its presence and value do not affect decoder conformance to profiles specified in Annex A. Decoders conforming to this version of this Specification shall ignore all dp_extension_data_flag syntax elements.
...

The table below provides descriptions related to the specific NAL unit within the sub-bitstream extraction procedure.

TABLE 16

Remove from outBitstream all NAL units with nal_unit_type not equal to any of DP_NUT, VPS_NUT, DCI_NUT, and EOB_NUT and with nuh_layer_id not included in the list LayerIdInOls[ targetOlsIdx ].

According to the embodiment(s) of the present disclosure described together with the table(s), multilayer-based coding may be performed. Multilayer-based coding may output a decoded picture based on a target output layer, and for example, the target output layer may be derived based on a target OLS. The target OLS index for the target OLS may be set based on an external means or signaled information. According to one embodiment of the present disclosure, signaled information for setting the target OLS index may be included in a specific NAL unit. The specific NAL unit may be referred to as a DP NAL unit or an OPI NAL unit.

Figure 7:
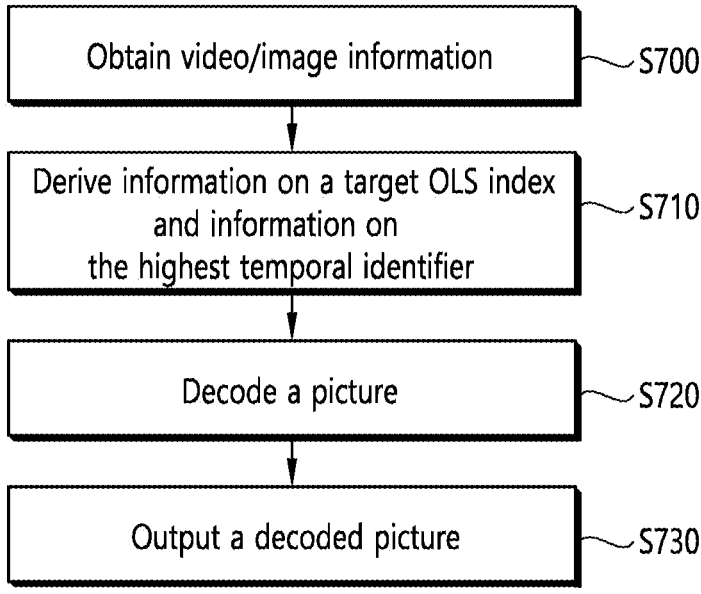
FIG. 7 illustrates one example of a video/image decoding method according to an embodiment(s) of the present disclosure.

FIG. 7 illustrates one example of a video/image decoding method according to an embodiment(s) of the present disclosure.

The method disclosed in FIG. 7 may be performed by the decoding apparatus disclosed in FIG. 4 or 5. Specifically, for example, S700 and/or S710 step of FIG. 7 may be performed by the demultiplexer 505 of the decoding apparatus of FIG. 5, S720 and/or S730 step may be performed by the decoder (500-0 or 500-1) of the decoding apparatus of FIG. 5, and the method disclosed in FIG. 7 may include the embodiments of the present disclosure.

Referring to FIG. 7, the decoding apparatus may receive/obtain video/image information S700. The video/image information may include residual information, prediction-related information, reference picture-related information, sub-picture related information, multilayer-related information, and temporal scalability-related information. The decoding apparatus may receive/obtain the image/video information through a bitstream.

The image/video information may include various pieces of information according to an embodiment of the present disclosure. For example, the image/video information may include the information disclosed in at least one of Tables 1 to 16 above.

The decoding apparatus may derive information on the target OLS index and information on the highest temporal identifier based on the image information S710. For example, the value of the target OLS index may be set to be the same as the value of the information on the target OLS index. In one example, the value of the highest temporal identifier may be set equal to the value of information on the highest temporal identifier −1.

The decoding apparatus may derive output layer sets (OLSs) based on a bitstream. For example, OLSs may be derived based on a VPS obtained from a bitstream. For example, the number of OLSs and at least one layer included in the OLS may be determined/specified based on the VPS.

The decoding apparatus may set a target OLS index for the OLSs. For example, layers except for the layer(s) included in the OLSs indicated by a target OLS index may not be included in a CVS for decoding.

The decoding apparatus may decode a picture belonging to a layer included in a target OLS for the target OLS index and being related to the highest temporal identifier S720. For example, a layer included in the target OLS related to the target OLS index may include a NAL unit, and the decoding apparatus may decode at least one picture based on the NAL unit. For example, the NAL unit may include prediction-related information, filtering-related information, and residual-related information.

The decoding apparatus may output at least one decoded picture S730. The decoding apparatus may output the decoded picture according to (predetermined) output order. The decoding apparatus may output each decoded picture for each layer.

In one embodiment, the image information may include a specific network abstraction layer (NAL) unit. For example, the information on the target OLS index and the information on the highest temporal identifier may be derived based on the specific NAL unit.

In one embodiment, the temporal identifier of the specific NAL unit may be 0.

In one embodiment, the layer identifier of the specific NAL unit may not be constrained. In other words, the layer identifier of the specific NAL unit may have any value.

In one embodiment, the specific NAL unit may belong to an intra random access point access unit (IRAP AU) or a gradual decoding refresh access unit (GDR AU).

In one embodiment, the image information may include an access unit (AU) containing the access unit delimiter (AUD) NAL unit and the specific NAL unit. In one example, the specific NAL unit may be a first NAL unit following the AUD NAL unit within the AU. In another example, the specific NAL unit may be the first NAL unit within the AU.

In one embodiment, the target OLS index may be set based on OLS index information obtained from an external means or the specific NAL unit. For example, an external means may be used preferentially over the OLS index information to set the target OLS index. Here, the external means may not be included in a bitstream generated by the encoding apparatus but may be transmitted from outside the bitstream based on a control protocol. External means may not be generated by the encoder but may be generated, for example, in a player or in decoding control logic that employs a decoding apparatus. The decoding apparatus may have an interface for inputting an external means (e.g., a kind of variable value). For example, the external means may be an application programming interface (API) implemented in a specific application domain between a video player and the decoder. The decoding apparatus may derive information necessary to start a decoding process based on an external means, thereby securing flexibility in each application domain. It should be clear to those skilled in the art that the external means may be replaced with various terms such as an external variable/value, an external input variable/value, an externally provided variable/value, an externally specified variable/value, a variable/value specified to the outside, and a variable/value not provided in the standard specification.

In one embodiment, based on a case in which an external means is available, the target OLS index may be set based on the external means. Based on a case in which an external means is unavailable, the target OLS index may be set based on the OLS index information.

In one embodiment, the method may further include setting the highest temporal identifier (ID) for identifying the highest temporal sublayer. The at least one picture may be decoded based on the highest temporal ID. The highest temporal ID may be set based on the highest temporal ID-related information obtained through an external means or the specific NAL unit. The external means may be used preferentially over the highest temporal ID-related information to set the highest temporal ID.

In one embodiment, the at least one picture may be decoded based on a temporal sublayer having a temporal ID. For example, the value of the temporal ID may be smaller than the highest temporal ID.

In one embodiment, image information obtained from the bitstream may include a video parameter set (VPS). For example, the OLSs may be derived based on the VPS.

In one embodiment, the decoding method includes obtaining image information based on a sub-bitstream, decoding a picture belonging to a layer included in a target OLS for a target output layer set (OLS) index and being related to the highest temporal identifier, and outputting the decoded picture. The sub-bitstream may be derived based on a sub-bitstream extraction process for a bitstream. Inputs of the sub-bitstream extraction process may include a value related to the target OLS index and a value related to the highest temporal identifier.

In one embodiment, the sub-bitstream extraction process may include removing a specific network abstraction layer (NAL) unit including information on the target OLS index and information on the highest temporal identifier.

In one embodiment, the sub-bitstream may include a specific network abstraction layer (NAL) unit including information on the target OLS index. The value of the information on the target OLS index may be set based on an input for the sub-bitstream extraction process.

In one embodiment, the sub-bitstream may include a specific network abstraction layer (NAL) unit including information on the highest temporal ID. The value of the information on the highest temporal ID may be set based on an input for the sub-bitstream extraction process.

In one embodiment, the decoding apparatus may include a bitstream extractor deriving a sub-bitstream from a bitstream based on a sub-bitstream extraction process and obtaining image information from the sub-bitstream; and a decoder decoding a picture belonging to a layer included in a target output layer set (OLS) for a target OLS index and being related to the highest temporal identifier and outputting the decoded picture. Inputs of the sub-bitstream extraction process may include a value related to the target OLS index and a value related to the highest temporal ID.

When there are residual samples for the current block, the decoding apparatus may receive information on the residuals for the current block. Information on the residuals may include transform coefficients on the residual samples. Based on the residual information, the decoding apparatus may derive residual samples (or a residual sample array) for the current block. Specifically, the decoding apparatus may derive quantized transform coefficients based on the residual information. The quantized transform coefficients may have a one-dimensional vector form based on coefficient scan order. The decoding apparatus may derive transform coefficients based on a dequantization procedure for the quantized transform coefficients. The decoding apparatus may derive residual samples based on the transform coefficients.

The decoding apparatus may generate reconstructed samples based on prediction samples and residual samples and derive a reconstructed block or a reconstructed picture based on the reconstructed samples. Specifically, the decoding apparatus may generate reconstructed samples based on a sum of prediction samples and residual samples. Afterward, as described above, the decoding apparatus may apply an in-loop filtering procedure such as deblocking filtering and/or SAO procedure to the reconstructed picture to improve subjective/objective picture quality depending on the needs.

For example, the decoding apparatus may obtain image information including all or part of the information (or syntax elements) described above by decoding a bitstream or encoded information. Also, the bitstream or encoded information may be stored in a computer-readable storage medium and may cause the decoding method to be performed.

In the above-described embodiments, the methods are explained based on flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information for implementation (e.g., information on instructions) or an algorithm may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example.

Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 8:
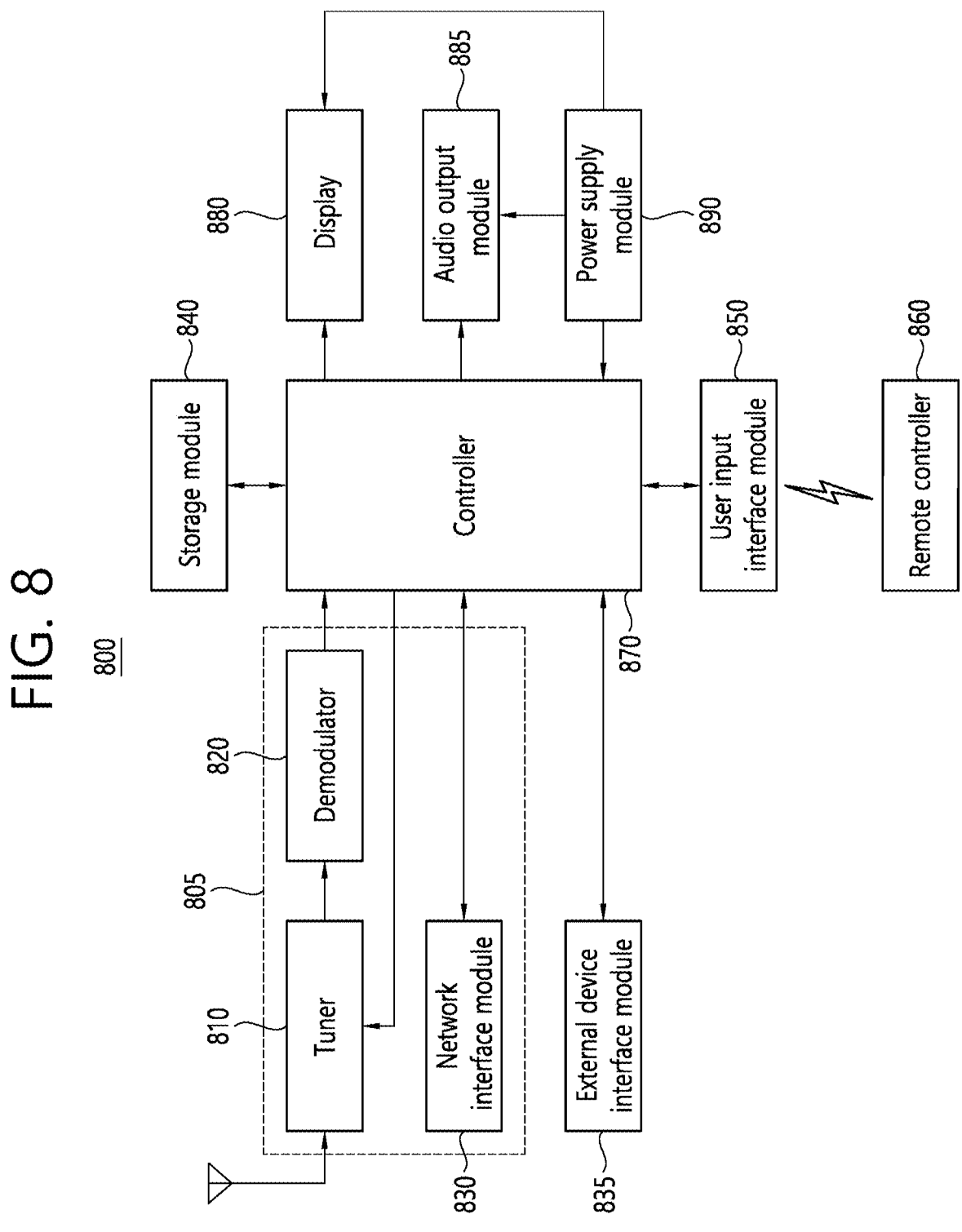
FIG. 8 is a block diagram illustrating a digital apparatus including a decoding apparatus according to one embodiment of the present disclosure.

FIG. 8 is a block diagram illustrating a digital apparatus including a decoding apparatus according to one embodiment of the present disclosure. The decoding apparatus according to one embodiment of the present disclosure may be included in the controller 870 of FIG. 8.

The digital apparatus 800 may include a broadcast reception module 805, an external device interface module 835, a storage module 840, a user input interface module 850, a controller 870, a display 880, and an audio output module 885, a power supply module 890, and an image capture module (not shown). Here, the broadcast reception module 805 may include at least one tuner 810, a demodulator 820, and a network interface module 830. However, in some cases, the broadcast reception module 805 may include the tuner 810 and the demodulator 820 but may not include them in other cases. It is the same for the network interface module 830. Also, although not shown in the figure, the broadcast reception module 805 may include a multiplexer for multiplexing a signal demodulated by the demodulator 820 through the tuner 810 and a signal received through the network interface 830. The broadcast reception module 805 may include a demultiplexer that demultiplexes a multiplexed signal or demultiplexes a demodulated signal or a signal passing through the network interface module 830.

The tuner 810 receives a radio frequency (RF) broadcast signal by tuning to a user-selected channel or all previously stored channels among RF broadcast signals received through an antenna. Also, the tuner 810 converts a received RF broadcast signal into an Intermediate Frequency (IF) signal or a baseband signal.

For example, if the received RF broadcast signal is a digital broadcast signal, the tuner 810 converts the signal into a digital IF signal (DIF); if the received RF broadcast signal is an analog broadcast signal, the tuner 810 converts the signal to an analog baseband video or an audio signal (CVBS/SIF). In other words, the tuner 810 may process both a digital broadcast signal and an analog broadcast signal. The analog baseband video or audio signal (CVBS/SIF) output from the tuner 810 may be directly input to the controller 870.

Also, the tuner 810 may receive a single-carrier RF broadcast signal according to the Advanced Television System Committee (ATSC) scheme or a multi-carrier RF broadcast signal according to the Digital Video Broadcasting (DVB) scheme.

Meanwhile, the tuner 810 may sequentially tune to and receive RF broadcast signals of all the stored broadcast channels through a channel memory function among the RF broadcast signals received through the antenna and convert the received RF broadcast signals into intermediate frequency signals or baseband signals.

The demodulator 820 receives and demodulates the digital IF signal (DIF) converted by the tuner 810. For example, when the digital IF signal output from the tuner 810 is the ATSC type, the demodulator 820 performs 8-Vestigial Side Band (8-VSB) demodulation. For example, the demodulator

820 may also perform channel decoding. To this end, the demodulator 820 may include a Trellis decoder, a deinterleaver, and a Reed-Solomon decoder for performing Trellis decoding, deinterleaving, and Reed-Soloman decoding.

For example, when the digital IF signal output from the tuner 810 is the DVB type, the demodulator 820 performs, for example, coded orthogonal frequency division modulation (COFDMA) demodulation. Also, the demodulator 820 may perform channel decoding. To this end, the demodulator 820 may include a convolutional decoder, a deinterleaver, and a Read-Soloman decoder to perform convolutional decoding, deinterleaving, and Read-Soloman decoding.

The demodulator 820 may output a stream signal TS after performing demodulation and channel decoding. In this case, the stream signal may be a signal obtained by multiplexing an image signal, an audio signal, or a data signal. For example, the stream signal may be an MPEG-2 transport stream (TS) in which an MPEG-2 standard video signal and a Dolby AC-3 standard audio signal are multiplexed. Specifically, the MPEG-2 TS may include a 4-byte header and 184-byte payload.

Meanwhile, the demodulator 820 described above may be separately provided according to the ATSC and DVB systems. In other words, the digital apparatus may separately include an ATSC demodulator and a DVB demodulator.

The stream signal output from the demodulator 820 may be input to the controller 870. The controller 870 may control demultiplexing, image/audio signal processing, and the like and control audio output through the display 880 and the audio output module 885.

The external device interface module 835 provides an environment that interfaces various external devices to the digital device 800. To this end, the external device interface module 835 may include an A/V input/output module (not shown) or wireless communication.

The external device interface module 835 may be connected in a wired or wireless manner to an external device such as a Digital Versatile Disk (DVD) player, a Blu-ray player, a game device, a camera, a camcorder, a computer (notebook, tablet), a smartphone, a Bluetooth device, and a cloud server. The external device interface module 835 transmits an externally input image, audio, or data (including images) signal to the controller 870 of the digital device through a connected external device. The controller 870 may control a processed video, audio, or data signal to be output to the connected external device. To this end, the external device interface module 835 may further include an A/V input/output module (not shown) or a wireless communication module (not shown). For example, the external device interface module 835 may provide an external means used for setting a target OLS index and/or the highest temporal ID according to one embodiment of the present disclosure.

The A/V input/output module may use USB ports, composite video banking sync (CVBS) ports, component ports, S-video (analog) ports, DVI digital visual interface (HDMI) ports, high-quality signal ports, multimedia interface (HDMI) ports, RGB ports, and D-SUB ports.

The wireless communication module may perform short-range communication with other electronic devices. The digital apparatus 600 may be connected to other electronic devices through a network according to communication protocols such as Bluetooth, Radio Frequency Identification (RFID), Infrared Data Association (IrDA), Ultra Wideband (UWB), ZigBee, and Digital Living Network Alliance. It may be connected to other electronic devices through a network based on a communication protocol.

Also, the external device interface module 835 may be connected to various set-top boxes through at least one of the various ports above to perform input/output operations with the set-top box.

Meanwhile, the external device interface module 835 may receive an application or an application list of a nearby external device and transmit the received application or application list to the controller 870 or the storage unit 840.

The network interface module 830 provides an interface for connecting the digital device 800 to a wired/wireless network including the Internet. The network interface module 830 may include, for example, an Ethernet terminal for connection with a wired network and may comply with, for example, the wireless local area network (WLAN) (Wi-Fi), wireless broadband (Wibro), worldwide interoperability for microwave access (Wimax), and High-Speed Downlink Packet Access (HSDPA) communication standards for wireless network connections.

The network interface module 830 may transmit and receive data to and from other users or other digital devices through a connected network or another network connected to the connected network. In particular, the network interface module 830 may transmit part of content data stored in the digital device 800 to another user registered in advance in the digital device 800 or to a selected user or a selected digital device among other digital devices.

Meanwhile, the network interface module 830 may access a predetermined web page through a connected network or another network connected to the connected network. In other words, the network interface module 830 may access a predetermined web page through a network to transmit and receive data to and from a server. Also, the network interface module 830 may receive content or data provided by a content provider or a network service provider. In other words, the network interface module 830 may receive content such as a movie, an advertisement, a game, VOD, a broadcast signal, and related information provided through a network from a content provider or a network service provider. Also, the network interface module 830 may receive firmware update information and an update file provided by a network service provider. Also, the network interface module 830 may transmit data to the Internet service provider, a content provider, or a network operator.

Also, the network interface module 830 may selectively receive a desired application among applications published through the network.

The storage module 840 may store a program for processing and controlling each signal in the controller 870 and may store a signal-processed video, audio, or data signal.

Also, the storage module 840 may perform the function of temporarily storing an image, an audio signal, or a data signal input from the external device interface module 835 or the network interface module 830. The storage module 840 may store information on a predetermined broadcast channel through the process below.

The storage module 840 may store an application or an application list input from the external device interface module 835 or the network interface module 830. Also, the storage module 840 may store various platforms to be described later.

The storage module 840 may store content in various storage devices such as a flash memory type, a hard disk type, a multimedia card micro type, a card type memory (e.g., SD or XD memory), a RAM, or a ROM (e.g., EEPROM). The digital device 800 may play content files (movie files, still image files, music files, document files, or application files) stored in the storage module 840 and provide the content to the user.

FIG. 8 shows an embodiment in which the storage module 840 is provided separately from the controller 870, but the scope of the embodiment is not limited to the specific case. In other words, the storage unit 840 may be included in the controller 870.

The user input interface module 850 transmits a signal input by the user to the controller 870 or transmits a signal of the controller 870 to the user.

For example, the user input interface module 850 controls power on/off, channel selection, screen configuration, and so forth based on a control signal received from the remote controller 860 according to various communication schemes employing RF or infrared (IR) communication. The user input interface module 850 may process a control signal from the controller 870 and transmit the processed control signal to the remote controller 860.

Also, the user input interface module 850 may transmit a control signal input from a local key (not shown) such as a power key, a channel key, a volume key, and a setting value to the controller 870.

The user input interface module 850 may transmit a control signal input from a sensing module (not shown) that detects a user's gesture to the controller 870 or transmit a signal from the controller 870 to the sensing module (not shown). Here, the sensing module may include a touch sensor, a voice sensor, a position sensor, and a motion sensor.

The controller 870 demultiplexes a stream input through the tuner 810, the demodulator 820, or the external device interface 835 or processes the demultiplexed signal to generate and output a signal for video or audio output. The controller 870 may include the encoding apparatus and/or the decoding apparatus described above.

The image signal processed by the controller 870 may be input to the display 880 and displayed as an image corresponding to the image signal. Also, the image signal processed by the controller 870 may be input to an external output device through the external device interface 835.

The audio signal processed by the controller 870 may be output to the audio output module 885. Also, the audio signal processed by the controller 870 may be input to an external output device through the external device interface 835. Although not shown in the figure, the controller 870 may include a demultiplexer and an image processor. The controller 870 may control the overall operation of the digital device 800. For example, the controller 870 may control the tuner 810 to control tuning of an RF broadcast corresponding to a channel selected by the user or a channel stored in advance.

The controller 870 may control the digital device 800 by an internal program input through a user instruction or the user input interface 850. In particular, the controller 870 may connect to a network so that the user may digitally download an application or a list of applications desired by the user.

For example, the controller 870 controls a tuner 810 to input a signal of a channel selected according to a predetermined channel selection command received through the user input interface 850. The controller 810 processes an image, voice, or data signal of the selected channel. The controller 870 may output the information on a channel selected by the user together with the processed image or voice signal through the display 880 or the audio output module 885. As another example, the controller 870 may control an image or audio signal from an external device (for example, a camera or a camcorder) input through the external device interface module 835 to be output through the display 880 or the audio output module 885.

The controller 870 may control the display 880 to display an image. For example, the controller 870 may control the display 880 to display a broadcast image input through the tuner 810, an external input image input through the external device interface module 835, an image input through the network interface module, or an image stored internally. At this time, the image displayed on the display 880 may be a still image or a moving image and may be a 2D image or a 3D image.

Also, the controller 870 may control the reproduction of content. In this case, the content may be the content stored in the digital device 800, received broadcast content, or externally input content input from the outside. The content may be at least one of a broadcast image, an external input image, an audio file, a still image, a connected web screen, and a document file.

Meanwhile, the controller 870 may control the display 880 to display an application or a list of applications that may be downloaded from the digital device 800 or an external network when the application view item progresses.

The controller 870 may control the installation and execution of applications downloaded from an external network together with various user interfaces. Also, the controller 870 may control an image related to an application to be executed by a user selection to be displayed on the display 880.

Although not shown in the figure, a channel browsing processor may be further provided to generate a thumbnail image corresponding to a channel signal or an external input signal.

The channel browsing processor may receive a stream signal TS output from the demodulator 820 or a stream signal output from the external device interface 835 and extract an image from the input stream signal to generate a thumbnail image.

The generated thumbnail image may be coded as it is or may be input to the controller 870. Also, the generated thumbnail image may be coded in the form of a stream to be input to the controller 870. The controller 870 may display a plurality of thumbnail lists. Thumbnail images on the display 880 may be generated using input thumbnail images. Meanwhile, thumbnail images of a thumbnail list may be updated sequentially or simultaneously. Accordingly, the user may easily figure out the contents of a plurality of broadcast channels.

The display 880 converts an image signal, a data signal, and an OSD signal processed by the controller 870; or an image signal and a data signal received from the external device interface module 835 into R, G, and B signals to generate drive signals. The display 880 may be a PDP, an LCD, an OLED, a flexible display, or a 3D display. The display 880 may be built as a touch screen and used as an input device together with an output device.

The audio output module 885 receives a signal processed by the controller 870, for example, a stereo signal, a 3.1 channel signal, or a 5.1 channel signal, and outputs an audio signal. The audio output module 885 may be implemented in various forms of speakers.

Meanwhile, as described above, a sensing module (not shown) including at least one of a touch sensor, a voice sensor, a position sensor, and a motion sensor may be further installed in the digital device to detect a user's gesture. The signal sensed by the sensing module (not shown) may be transmitted to the controller 870 through the user input interface module 850.

Meanwhile, an image capture module (not shown) for capturing an image of a user may be further provided. Image information captured by the image capture module (not shown) may be input to the controller 870. The controller 870 may detect a user's gesture by combining an image captured by the image capture module (not shown) or a signal detected by the sensing module (not shown).

The power supply module 890 supplies power corresponding to the entire digital device (800). In particular, the power supply module 890 may supply power to the controller 870 that may be implemented in the form of a system-on-chip (SOC), the display 880 for displaying an image, and the audio output module 885 for outputting an audio signal. To this end, the power supply module 890 may include a converter (not shown) that converts AC power into DC power. Meanwhile, for example, when the display 880 is implemented as a liquid crystal panel having a plurality of backlight lamps, an inverter (not shown) capable of performing a PWM operation for brightness control or dimming may be further provided.

The remote controller 860 transmits a user input to the user input interface module 850. To this end, the remote controller 860 may use Bluetooth, radio frequency (RF) communication, infrared (IR) communication, Ultra Wide-band (UWB), or ZigBee (ZigBee).

Also, the remote controller 860 may receive an image, audio, or data signal output from the user input interface module 850 and display the received signal on the remote controller 860 or output the received signal in the form of sound or vibration.

The digital device 800 may be a digital broadcast receiver capable of processing fixed or mobile ATSC signals or DVB digital broadcast signals.

Also, the constituting elements of the digital device according to one embodiment of the present disclosure may be omitted and, if necessary, may further include some constituting elements not shown in the figure. Meanwhile, unlike the description above, the digital device may not include the tuner and the demodulator and may receive and play content through the network interface module or the external device interface module.

Figure 9:
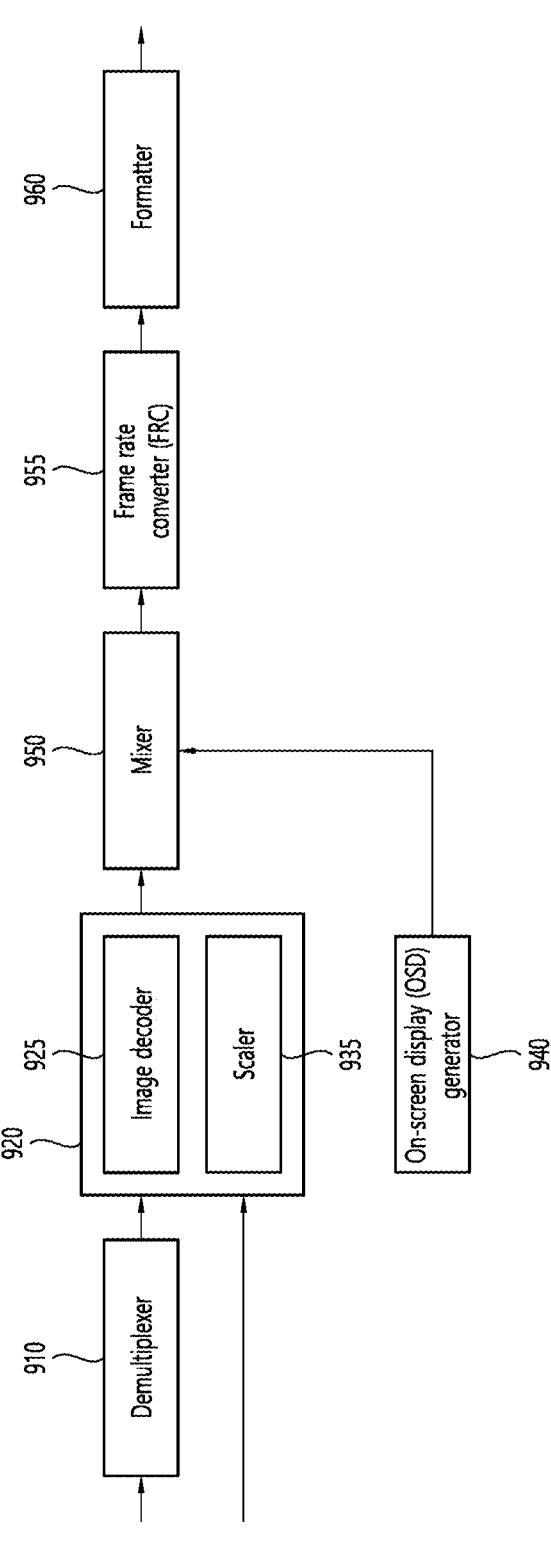
FIG. 9 is a block diagram illustrating a controller including a decoding apparatus according to one embodiment of the present disclosure.

FIG. 9 is a block diagram illustrating a controller including a decoding apparatus according to one embodiment of the present disclosure. For example, the image decoder 925 may be the decoding apparatus according to one embodiment of the present disclosure. The controller of FIG. 9 may be an example of the controller 870 included in FIG. 8.

Examples of the controller may include a demultiplexer 910, an image processor 920, an on-screen display (OSD) generator 940, a mixer 950, a frame rate converter (FRC) 955, and a formatter 760. As shown in the figure, the controller may further include an audio processor and a data processor.

The demultiplexer 910 demultiplexes an input stream. For example, the demultiplexer 910 may demultiplex the input MPEG-2 TS into a video, audio, and data signal. Here, the stream signal input to the demultiplexer 910 may be a stream signal output from a tuner, a demodulator, or an external device interface module.

The image processor 920 performs image processing of the demultiplexed image signal. To this end, the image processor 920 may include an image decoder 925 and a scaler 935.

The image decoder 925 decodes the demultiplexed image signal, and the scaler 935 scales the resolution of the decoded image signal so that the display may output the decoded image signal. The image decoder 925 may support various standards. For example, the image decoder 925 performs the function of an MPEG-2 decoder when an image signal is coded according to the MPEG-2 standard, and the image decoder 925 performs the function of a related decoder when an image signal is coded according to the MPEG-2 standard.

Meanwhile, the image signal decoded by the image processor 920 is input to the mixer 950. The OSD generator 940 generates OSD data according to a user input or a built-in process. For example, the OSD generator 940 generates data for displaying various data in the form of graphics or text on the screen of the display 880 based on a control signal of the user input interface. The generated OSD data includes various data such as a user interface screen of a digital device, various menu screens, widgets, icons, and audience rating information.

The OSD generator 940 may generate data for displaying broadcast information based on a caption or EPG of a broadcast image.

The mixer 950 mixes the OSD data generated by the OSD generator 940 and the image signal processed by the image processor and provides the mixed signal to the formatter 960. The decoded image signal and OSD data are mixed and displayed with the OSD overlaid on the decoded image.

The frame rate converter (FRC) 955 converts the frame rate of the input image. For example, the frame rate converter 955 may convert images with a frame rate of 60 Hz into images with a frame rate of, for example, 120 Hz or 240 Hz according to an output frequency of the display. There may be various methods for converting the frame rate as described above. For example, when converting the frame rate from 60 Hz to 120 Hz, the frame rate converter 955 may insert, between the first frame and the second frame, the same first frame or a third frame predicted from the first frame and the second frame. In another example, when converting the frame rate from 60 Hz to 240 Hz, the frame rate converter 955 may insert three identical or predicted frames between existing frames. Meanwhile, when a separate frame conversion is not performed, the frame rate converter 955 may be bypassed.

Formatter 960 changes the output of the input frame rate converter 955 to match the output format of the display. For example, the formatter 960 may output R, G, and B data signals, and the R, G, and B data signals may be output in the low voltage differential signaling (LVDS) or mini LVDS format. Also, when the output of the input frame rate converter 955 is a 3D image signal, the formatter 960 may compose and output the signal in a 3D form according to the output format of the display to support a 3D service through the display.

The control unit's audio processor (not shown) may perform processing of a demultiplexed audio signal. The audio processor (not shown) may support processing various audio formats. For example, even when an audio signal is encoded in a format such as the MPEG-2, MPEG-4, AAC, HE-AAC, AC-3, BSAC, and EVS, the audio processor may include a decoder related to the encoding format. Also, the audio processor (not shown) in the controller may process bass, treble, and volume control.

The data processor (not shown) in the controller may perform data processing of a demultiplexed data signal. For example, even when a demultiplexed data signal is coded, the data processor may decode the demultiplexed data signal. Here, the coded data signal may be EPG information including broadcast information such as the start and end times of a broadcast program broadcast on each channel.

Meanwhile, the digital apparatus is an example according to one embodiment of the present disclosure, and each constituting element may be integrated, added, or omitted according to the technical specifications of a digital apparatus actually implemented. In other words, two or more constituting elements may be combined into one constituting element, or one constituting element may be divided into two or more constituting elements depending on the needs. Also, the function performed in each block is intended only to illustrate an embodiment of the present disclosure; therefore, a specific operation or apparatus does not limit the technical scope of the embodiment of the present disclosure.

Meanwhile, the digital apparatus may be an image signal processing device that performs signal processing of an image stored in the device or an input image. As another example of the image signal processing device, a set-top box (STB) excluding the display 880 and the audio output module 885, the aforementioned DVD player, a Blu-ray player, a game device, or a computer may be further included.

Figure 10:
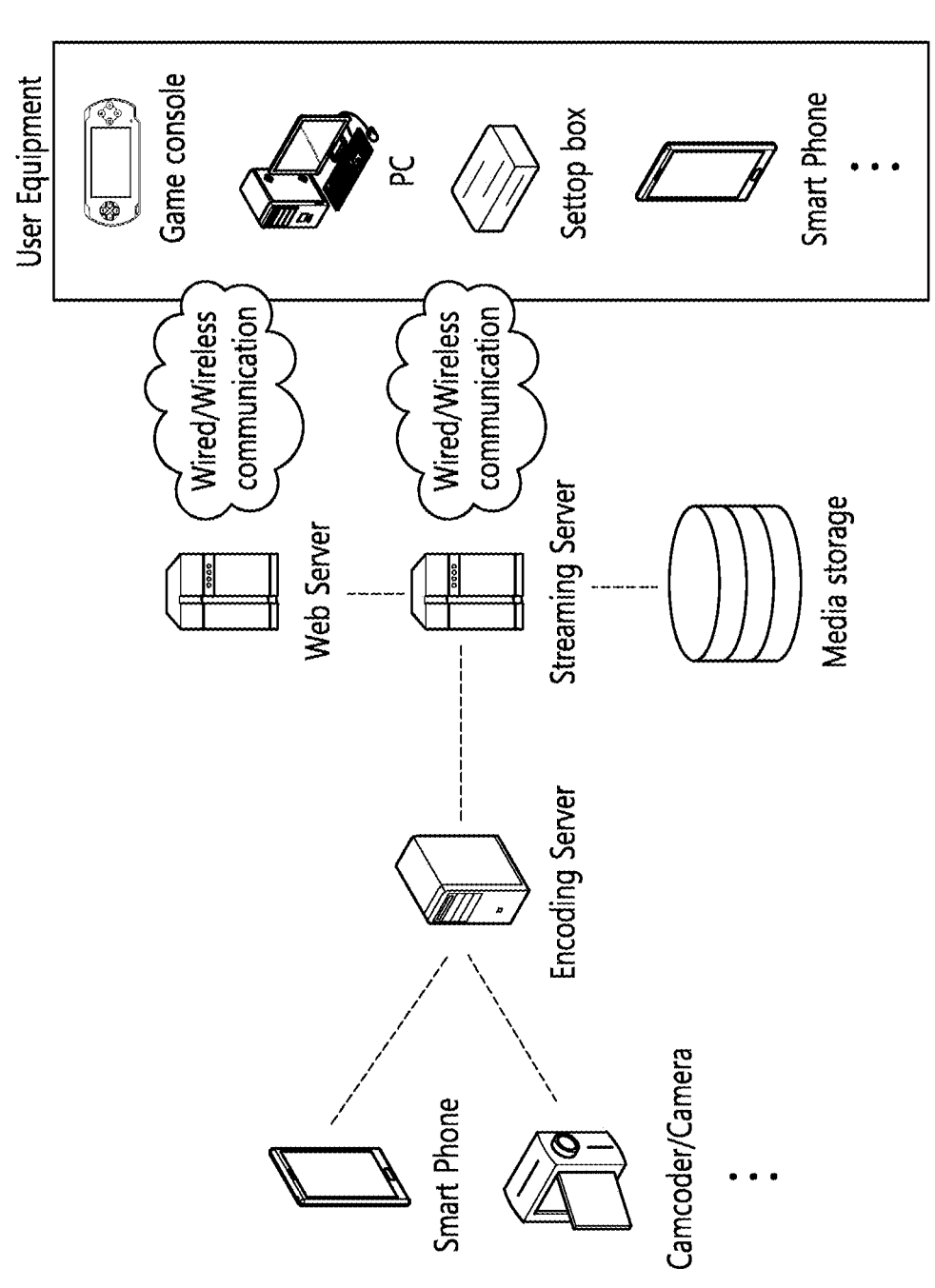
FIG. 10 illustrates an example of a content streaming system to which the exemplary embodiments disclosed in the present document are applicable.

FIG. 10 illustrates an example of a content streaming system to which embodiments disclosed in this document may be applied.

Referring to FIG. 10, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment (s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The appended claims of the present disclosure may be combined in various ways. For example, technical features of method claims of the present disclosure may be combined to be implemented as an apparatus, and technical features of apparatus claims of the present disclosure may be combined to be implemented as a method. Also, technical features of method claims and technical features of apparatus claims of the present disclosure may be combined to be implemented as an apparatus, and technical features of method claims and technical features of apparatus claims of the present disclosure may be combined to be implemented as a method.

What is claimed is:

1. An apparatus for decoding an image, the apparatus comprising:

a memory configured to store the image; and a processor coupled with the memory, wherein the processor is configured to:

obtain image information from a bitstream;

obtain, based on an output layer set (OLS) index related flag, information on a target OLS index from a specific network abstraction layer (NAL) unit in the image information, wherein the OLS index related flag specifies whether the information on the target OLS index is present in the specific NAL unit;

obtain information on a highest temporal identifier from the specific NAL unit in the image information;

decode a picture belonging to a layer included in a target OLS for the target OLS index and being related to the highest temporal identifier; and output the decoded picture, wherein the specific NAL unit is different from a video parameter set (VPS) NAL unit, wherein based on the image information comprising an access unit (AU) that includes both an access unit delimiter (AUD) NAL unit and the specific NAL unit, the specific NAL unit is an initial NAL unit following the AUD NAL unit in the AU, and wherein based on the image information comprising an AU that includes the specific NAL unit and does not include the AUD NAL unit, the specific NAL unit is an initial NAL unit in the AU.

2. The apparatus of claim 1, wherein a temporal identifier of the specific NAL unit is 0.

3. The apparatus of claim 2, wherein a layer identifier of the specific NAL unit is not constrained.

4. The apparatus of claim 1, wherein the specific NAL unit belongs to an intra random access point access unit (IRAP AU) or a gradual decoding refresh access unit (GDR AU).

5. The apparatus of claim 1, wherein the target OLS index is set based on an external means or the information on the target OLS index, wherein based on the external means being available, the target OLS index is set based on the external means, and wherein based on the external means not being available, the target OLS index is set based on the information on the target OLS index.

6. The apparatus of claim 1, wherein the highest temporal identifier is set based on an external means or the information on the highest temporal identifier, wherein based on the external means being available, the highest temporal identifier is set based on the external means, and wherein based on the external means not being available, the highest temporal identifier is set based on the information on the highest temporal identifier.

7. The apparatus of claim 1, wherein the picture is decoded based on a temporal sublayer having a temporal identifier, and wherein a value of the temporal identifier is smaller than that of the highest temporal identifier.

8. An apparatus for encoding an image, the apparatus comprising:

a memory configured to store the image; and a processor coupled with the memory, wherein the processor is configured to:

generate information on a target output layer set (OLS) index;

generate information on a highest temporal identifier, generate, based on an OLS index related flag, a specific network abstraction layer (NAL) unit so that the information on the target OLS index is included in the specific NAL unit, wherein the OLS index related flag specifies whether the information on the target OLS index is present in the specific NAL unit, and wherein the specific NAL unit further includes the information on the highest temporal identifier; and encode image information including the specific NAL unit, wherein the specific NAL unit is different from a video parameter set (VPS) NAL unit, wherein, based on the image information comprising an access unit (AU) that includes both an access unit delimiter (AUD) NAL unit and the specific NAL unit, the specific NAL unit is an initial NAL unit following the AUD NAL unit in the AU, and wherein, based on the image information comprising an AU that includes the specific NAL unit and does not include the AUD NAL unit, the specific NAL unit is an initial NAL unit in the AU.

9. The apparatus of claim 8, wherein a temporal identifier of the specific NAL unit is 0.

10. The apparatus of claim 9, wherein a layer identifier of the specific NAL unit is not constrained.

11. The apparatus of claim 8, wherein the specific NAL unit belongs to an intra random access point access unit (IRAP AU) or a gradual decoding refresh access unit (GDR AU).

12. The apparatus of claim 8, wherein the target OLS index is set based on an external means or the information on the target OLS index, wherein based on the external means being available, the target OLS index is set based on the external means, and wherein based on the external means not being available, the target OLS index is set based on the information on the target OLS index.

13. The apparatus of claim 8 wherein the highest temporal identifier is set based on an external means or the information on the highest temporal identifier, wherein based on the external means being available, the highest temporal identifier is set based on the external means, and wherein based on the external means not being available, the highest temporal identifier is set based on the information on the highest temporal identifier.

14. An apparatus comprising:

a processor configured to generate a bitstream for image information comprising a specific network abstraction layer (NAL) unit including information on a target output layer set (OLS) index based on an OLS index related flag specifying whether the information on the target OLS index is present in the specific NAL unit, the specific NAL unit further including information on a highest temporal identifier; and a transmitter configured to transmit data comprising the bitstream of the image information, wherein the specific NAL unit is different from a video parameter set (VPS) NAL unit, wherein, based on the image information comprising an access unit (AU) that includes both an access unit delimiter (AUD) NAL unit and the specific NAL unit, the specific NAL unit is an initial NAL unit following the AUD NAL unit in the AU, and wherein, based on the image information comprising an AU that includes the specific NAL unit and does not include the AUD NAL unit, the specific NAL unit is an initial NAL unit in the AU.

* * * * *